United States Patent
Javadian et al.

(10) Patent No.: US 12,270,384 B2
(45) Date of Patent: Apr. 8, 2025

(54) CONNECTION SYSTEM FOR ATTACHING A BLADE ACCESS SYSTEM TO A NACELLE OF A WIND TURBINE AND METHOD OF USING SAME

(71) Applicant: Vestas Wind Systems A/S, Aarhus N (DK)

(72) Inventors: Payam Javadian, Aarhus N (DK); Thomas William Christophersen, Aarhus C (DK); Balachandar Mahalingam, Coimbatore (IN); Joris Kofman, Aalborg Øst (DK); Niels Møller Madsen, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 141 days.

(21) Appl. No.: 18/267,814

(22) PCT Filed: Dec. 9, 2021

(86) PCT No.: PCT/DK2021/050360
§ 371 (c)(1),
(2) Date: Jun. 16, 2023

(87) PCT Pub. No.: WO2022/128029
PCT Pub. Date: Jun. 23, 2022

(65) Prior Publication Data
US 2024/0052812 A1    Feb. 15, 2024

(30) Foreign Application Priority Data

Dec. 18, 2020  (IN) .............................. 202011055222
Feb. 9, 2021   (DK) ........................... PA 2021 70059

(51) Int. Cl.
*F03D 80/50*    (2016.01)

(52) U.S. Cl.
CPC ........ *F03D 80/502* (2023.08); *F05B 2230/80* (2013.01)

(58) Field of Classification Search
CPC ........ F03D 80/502; F03D 80/55; F03D 80/40; F03D 80/50; F03D 17/004; F03D 80/001;
(Continued)

(56) References Cited

U.S. PATENT DOCUMENTS

2011/0024233 A1*  2/2011  Lott ........................ F03D 80/50
                                                          182/129
2018/0087490 A1   3/2018  Fraughton et al.

FOREIGN PATENT DOCUMENTS

EP    2394947 A1    12/2011
KR    101324979 B1  11/2013
(Continued)

OTHER PUBLICATIONS

International Searching Authority, International Search Report and Written Opinion, issued in corresponding PCT Application No. PCT/DK2021/050360, dated Mar. 3, 2022.

*Primary Examiner* — Aaron R Eastman
(74) *Attorney, Agent, or Firm* — Wood Herron & Evans LLP

(57) ABSTRACT

A blade access system (24) includes a support frame (28) configured to be coupled to a nacelle (14) of a wind turbine (10), the support frame (28) having at least one connecting member (42) configured to be selectively attached to and detached from at least one connecting member (40) included with the nacelle (14). A nacelle (14) includes at least one connecting member (40) configured to be coupled to at least one connecting member (42) of a support frame (28) of a blade access system (24). The at least one support frame connecting member (42) is configured to cooperate with the at least one nacelle connecting member (40) to define an unlocked position which is configured to allow the support (Continued)

frame (28) to attach to and detach from the nacelle (14), and a locked position which is configured to prevent the support frame (28) from detaching from the nacelle (28). A method of connecting the blade access system (24) to the nacelle (14) is also disclosed.

31 Claims, 19 Drawing Sheets

(58) Field of Classification Search
CPC .... F03D 80/501; F03D 80/504; F03D 80/505; F03D 80/507; F03D 80/509; F05B 2230/80; F05B 2230/61; Y02E 10/72; Y02P 70/50

See application file for complete search history.

(56) References Cited

FOREIGN PATENT DOCUMENTS

| | | | |
|---|---|---|---|
| WO | 2004081373 | A2 | 9/2004 |
| WO | 2004092577 | A1 | 10/2004 |
| WO | 2009121792 | A2 | 10/2009 |
| WO | 2016138904 | A1 | 9/2016 |

* cited by examiner

CONNECTION SYSTEM FOR ATTACHING A BLADE ACCESS SYSTEM TO A NACELLE OF A WIND TURBINE AND METHOD OF USING SAME

TECHNICAL FIELD

This invention relates generally to wind turbines, and more particularly to an improved connection system for selectively attaching/detaching a blade access system to/from a nacelle of the wind turbine during inspection, maintenance or repair of a wind turbine blade, and to a method of using the connection system to attach the blade access system to the nacelle of the wind turbine.

BACKGROUND

Wind turbine generators are used to produce electrical energy using a renewable resource and without combusting a fossil fuel. A wind turbine generator converts kinetic energy from the wind into electrical energy, and includes a tower, a nacelle mounted atop the tower, a rotor hub rotatably supported by the nacelle, and a plurality of rotor blades attached to the hub. The hub is coupled to a generator housed inside the nacelle. Consequently, as wind forces the blades to rotate, electrical energy is produced by the generator. In recent years, wind power has become a more attractive alternative energy source and the number of wind turbines, wind farms, etc. has significantly increased, both on land and offshore. Additionally, the size of wind turbines has also significantly increased, with modern wind turbine blades extending between 50 to 80 meters in length, and the length of wind turbine blades is expected to further increase in the future.

It may be necessary to access the wind turbine blades several times during the lifetime of the wind turbine. For example, it may be necessary to access the surface of the wind turbine blade for inspection, maintenance, repair, and/or other purposes. Blade service platforms have previously been used for such purposes. To access a wind turbine blade, the blade may first be oriented so as to point downwardly and generally parallel with the wind turbine tower. The blade service platform may then be positioned on the ground, truck or tower platform adjacent the base of the tower and a number of lifting cables may be coupled to the nacelle and attached to the blade service platform. Winches on the blade service platform may be activated to wind the lifting cables thereby lifting the blade service platform vertically upward along the tower and adjacent the wind turbine blade. Technicians and other service personnel located on the service platform may more conveniently access the surface of the wind turbine blade and conduct various tests and/or procedures to ensure the proper operation of the wind turbine blade. By way of example, Assignee's PCT Publication No. WO 2004/092577 discloses such a blade service platform. Other blade service platforms may also be used in the blade access system.

While blade service platforms are quite useful and extensively used in the industry to service wind turbine blades, there remain some deficiencies with such blade access systems. For example, the connection of the lifting cables to the nacelle is an expensive and time-consuming process. To adequately support the blade service platform, the lifting cables are typically connected to a structural part of the nacelle, such as the bed plate of the nacelle or the nacelle frame supported on the bed plate. To this end, the fiberglass panels that form the outer housing of the nacelle are generally considered structurally insufficient to support the blade service platform. Thus, simply attaching the lifting cables to the outer housing of the nacelle is unfeasible. Accordingly, holes or other openings are generally cut in the outer housing of the nacelle to allow the lifting cables to access the bed plate or structural frame inside of the nacelle. Once work with the blade access system on one or more of the wind turbine blades is completed, the blade service platform is lowered to the ground or tower platform and the lifting cables detached from the nacelle. Lastly, the holes in the outer housing of the nacelle are closed up to limit the ingress of air, water and other debris into the nacelle. When it again comes time to service one or more of the wind turbine blades, the holes are again cut in the outer housing of the nacelle so that the lifting cables can access the structural aspects of the nacelle.

In view of the above drawbacks, manufacturers seek an improved design for supporting a blade access system, including a blade service platform, from the nacelle of the wind turbine. More particularly, a connection system and related method that allows the blade access system to be supported from the nacelle in a low cost, easy-to-implement, time-efficient, reliable and repeatable manner that obviates the need to time and again cut holes in the outer housing of the nacelle is needed.

SUMMARY

A blade access system for servicing at least one blade of a wind turbine having an improved connection to the wind turbine is disclosed. The wind turbine includes a tower, a nacelle coupled to the tower, and a rotor coupled to the nacelle and having the at least one blade. The blade access system includes a support frame configured to be coupled to the nacelle, a plurality of lifting cables configured to be coupled to the support frame, and a blade service platform configured to be coupled to the plurality of lifting cables and move along the at least one blade using the plurality of lifting cables. The support frame includes at least one support frame connecting member configured to be selectively attached to and detached from at least one nacelle connecting member included with the nacelle. The at least one support frame connecting member is configured to cooperate with the at least one nacelle connecting member to define an unlocked position which is configured to allow the support frame to attach to and detach from the nacelle, and a locked position which is configured to prevent the support frame from detaching from the nacelle.

In one embodiment, the at least one support frame connecting member may be movable relative to the support frame between a first position and a second position. The first position corresponds to the unlocked position relative to the nacelle connecting member and the second position corresponds to the locked position relative to the nacelle connecting member. More particularly, the at least one support frame connecting member may be rotatable relative to the support frame between the first position and the second position. In an exemplary embodiment, the at least one support frame connecting member includes a lock element in the form of a lock pin. The lock pin includes an elongate shaft, an enlarged head at a first end of the elongate shaft, and a lock nut attachable to a second end of the elongate shaft. The lock pin includes a passageway extending from the enlarged head to the second end of the elongate shaft. In an exemplary embodiment, the enlarged head may be asymmetric. For example, the enlarged head may be generally rectangular with a first side having a first length and a second side having a second length, wherein the second length is less than the first length.

In one embodiment, the support frame may include an anchor beam defining an upper wall, lower wall, rear wall, front wall, first end, and second end. The plurality of lifting cables are configured to be coupled to the lower wall of the anchor beam, and the lock pin is configured to extend through the anchor beam such that the enlarged head is adjacent the upper wall and the lock nut is adjacent the lower wall. The support frame may further include at least one tower guide coupled to the rear wall of the anchor beam and configured to engage with the tower of the wind turbine during mounting of the support frame to the nacelle. Furthermore, the support frame may further include support feet adjacent the first and second ends of the anchor beam configured to support the support frame on a work surface. Further yet, the support frame may include a first outrigger configured to be rotatably mounted to the first end of the anchor beam and a second outrigger configured to be rotatably mounted to the second end of the anchor beam. Each of the first and second outriggers includes at least one tower guide configured to engage with the tower of the wind turbine during mounting of the support frame to the nacelle.

In a further aspect, the blade access system may further include a key for arranging the at least one nacelle connecting member and the at least one support frame connecting member in the locked and unlocked positions. In an exemplary embodiment, the support frame may include a plurality of support frame connecting members configured to cooperate with a plurality of nacelle connecting members included with the nacelle to mount the support frame to the nacelle. For example, the anchor beam may include a lock pin adjacent each of the first and second ends of the beam.

In another embodiment, a nacelle for a wind turbine configured for coupling to a blade access system for servicing at least one blade of the wind turbine and having an improved connection is disclosed. The blade access system includes a support frame, a plurality of lifting cables, and a blade service platform. The nacelle includes an inner structural frame, an outer housing coupled to and disposed about the inner structural frame, and at least one nacelle connecting member coupled to the inner structural frame and configured to be selectively attached to and detached from at least one support frame connecting member included with the support frame of the blade access system. The at least one nacelle connecting member extends from the structural frame to the outer housing so as to be accessible from an exterior of the nacelle. The at least one nacelle connecting member is configured to cooperate with the at least one support frame connecting member to define an unlocked position which is configured to allow the support frame to attach to and detach from the nacelle, and a locked position which is configured to prevent the support frame from detaching from the nacelle.

In one embodiment, the structural frame includes a bed plate and the at least one nacelle connecting member is coupled to the bed plate. More particularly, the bed plate may include at least one lug having an opening extending through the at least one lug and the at least one nacelle connecting member is coupled to the at least one lug. In one embodiment, the outer housing includes a lower wall and the at least one nacelle connecting member extends from the structural frame to the lower wall so as to be accessible from the exterior of the nacelle. For example, an end of the nacelle connecting member may be either substantially flush with or extend beyond an exterior surface of the lower wall.

In an exemplary embodiment, the at least one nacelle connecting member includes a lock receiver in the form of a socket. The socket includes a tubular body having a first end, a second end, and a passageway extending between the first end and the second end. The first end is attached to the structural frame and the second end is adjacent the outer housing and accessible from the exterior of the nacelle. The socket further includes a keyway adjacent the second end of the tubular body and configured to allow or prevent the socket to engage with the at least one support frame connecting member. In one embodiment, the first end of the tubular body may include a flange for attaching the socket to the structural frame, and the second end of the tubular body may include an end plate, wherein the keyway may be formed in the end plate. In an exemplary embodiment, the keyway may be asymmetric. For example, the keyway may be configured as a generally rectangular slot with a first side having a first length and a second side having a second length, wherein the second length is less than the first length. In another embodiment, the end plate may further include a boss for limiting movement of the support frame connecting member when the support frame connecting member is engaged with the nacelle connecting member. In an exemplary embodiment, the nacelle may include a plurality of nacelle connecting members configured to cooperate with a plurality of support frame connecting members included with the support frame to mount the support frame to the nacelle.

In a further embodiment, a method of using a blade access system with a nacelle of a wind turbine for servicing at least one blade of the wind turbine is disclosed. The blade access system includes a support frame, a plurality of lifting cables, and a blade service platform. The wind turbine includes a tower, a nacelle coupled to the tower, and a rotor coupled to the nacelle and having the at least one blade. The support frame includes at least one support frame connecting member, the nacelle includes at least one nacelle connecting member accessible from an exterior of the nacelle, and the at least one support frame connecting member is configured to cooperate with the at least one nacelle connecting member to define an unlocked position which is configured to allow the support frame to attach to and detach from the nacelle, and a locked position which is configured to prevent the support frame from detaching from the nacelle. The method includes positioning the support frame on a work surface adjacent the tower; arranging the at least one support frame connecting member and the at least one nacelle connecting member in the unlocked position; raising the support frame from the work surface toward the nacelle; engaging the at least one support frame connecting member with the at least one nacelle connecting member; and arranging the at least one support frame connecting member and the at least one nacelle connecting member in the locked position to thereby attach the support frame to the nacelle.

In an exemplary embodiment, the at least one nacelle connecting member may be fixed to the nacelle and the at least one support frame connecting member may be movable relative to the support frame between a first position and a second position, wherein the first position corresponds to the unlocked position relative to the nacelle connecting member and the second position corresponds to the locked position relative to the nacelle connecting member. In one embodiment, arranging the at least one support frame connecting member and the at least one nacelle connecting member in the unlocked position further includes positioning the at least one support frame connecting member in the first position, and wherein arranging the at least one support frame connecting member and the at least one nacelle connecting member in the locked position further includes positioning the at least one support frame connecting member in the second position. For example, in one embodiment, positioning the at least one support frame connecting member in the first position may further include rotating the support frame connecting member to the first position, and positioning the at least one support frame connecting member in the second position may further include rotating the support frame connecting member to the second position. In one embodiment, arranging the at least one support frame connecting member and the at least one nacelle connecting member in the locked position may further include engaging the at least one support frame connecting member with a key from an interior of the nacelle and moving the key to position the at least one support frame connecting member in the second position.

In one embodiment, raising the support frame from the work surface toward the nacelle may further include providing at least one winch in the nacelle adjacent the at least one nacelle connecting member, the at least one winch capable of reeling out and paying in a pilot cable having an end; inserting the end of the pilot cable through the at least one nacelle connecting member; coupling the pilot cable to the at least one support frame connecting member on the support frame; and actuating the at least one winch to raise the support frame from the work surface toward the nacelle. In this way, the at least one support frame connecting member and the at least one nacelle connecting member align with each other as the support frame approaches the nacelle.

In one embodiment, the method may further include coupling the plurality of lifting cables to the support frame while the support frame is on the work surface. Further, the method may include positioning the blade service platform on the work surface adjacent the tower and attaching the plurality of lifting cables to the blade service platform, thereby permitting the blade service platform to move along the length of the at least one blade. The method may further include arranging the at least one support frame connecting member and the at least one nacelle connecting member in the unlocked position; disengaging the at least one support frame connecting member from the at least one nacelle connecting member to thereby detach the support frame from the nacelle; and lowering the support frame from the nacelle toward the work surface. In one embodiment, arranging the at least one support frame connecting member and the at least one nacelle connecting member in the unlocked position may further include positioning the at least one support frame connecting member in the first position.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
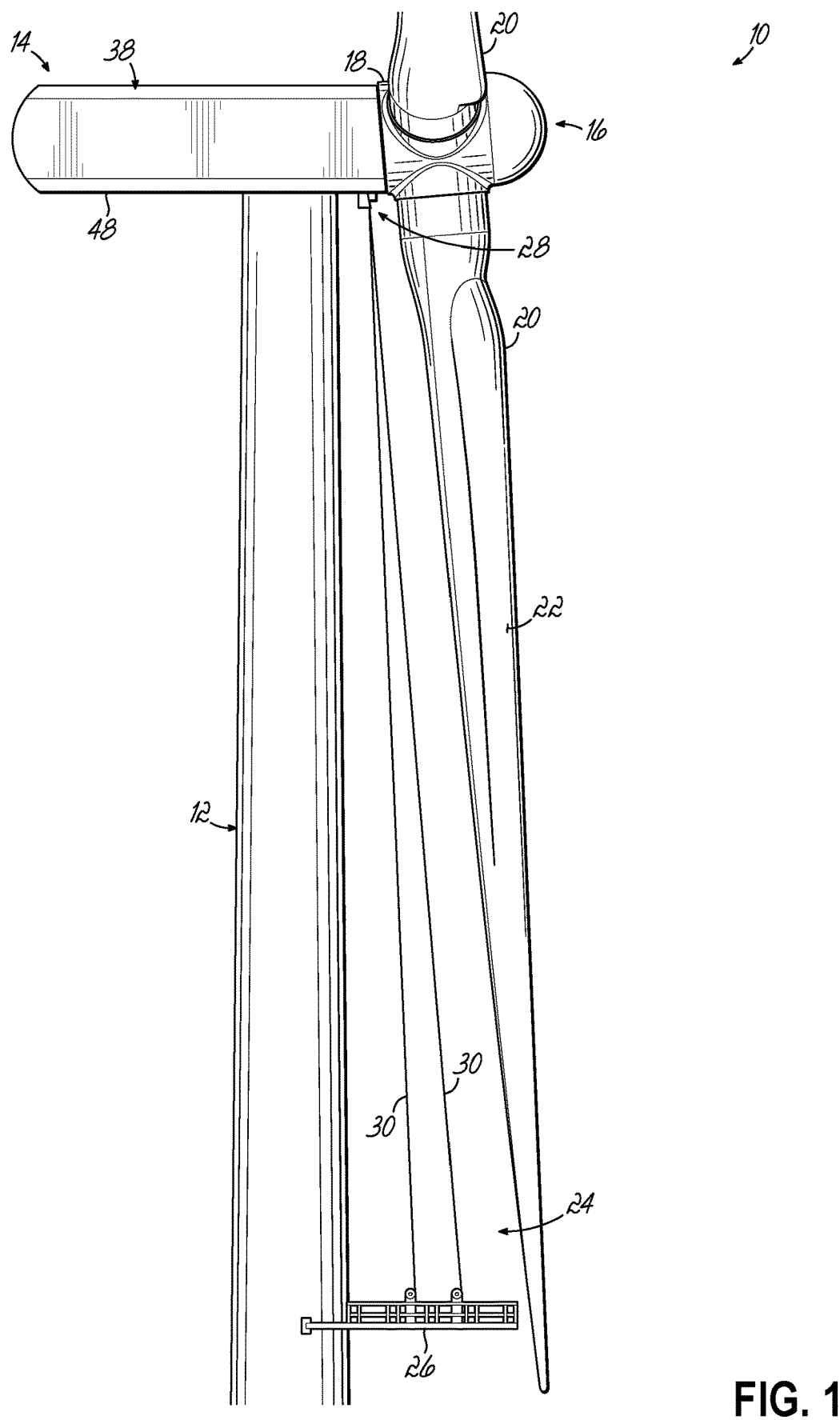
FIG. 1 is a side view of a wind turbine having a blade access system coupled to the wind turbine.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16 may include a central rotor hub 18 and a plurality of blades 20 attached to the central hub 18 at locations distributed about the circumference of the central hub 18. In the representative embodiment, the rotor 16 includes three blades 20, however the number may vary. The blades 20, which project radially outward from the central rotor hub 18, are configured to interact with passing air currents to produce rotational forces that cause the central hub 18 to spin about its longitudinal axis. The design, construction, and operation of the blades 20 are familiar to a person having ordinary skill in the art of wind turbine design and may include additional functional aspects to optimize performance. For example, pitch angle control of the blades 20 may be implemented by a pitch control mechanism (not shown) responsive to wind velocity to optimize power production in low wind conditions, and to feather the blades if wind velocity exceeds design limitations.

The rotor 16 may be coupled to the gearbox directly or indirectly via a main shaft extending between the rotor hub 18 and the gearbox. The main shaft rotates with the rotor 16 and is supported within the nacelle 14 by a main bearing support which supports the weight of the rotor 16 and transfers the loads on the rotor 16 to the tower 12. The gearbox transfers the rotation of the rotor 16 through a coupling to the generator. Wind exceeding a minimum level may activate the rotor 16, causing the rotor 16 to rotate in a direction substantially perpendicular to the wind, applying torque to the input shaft of the generator.

Figure 2:
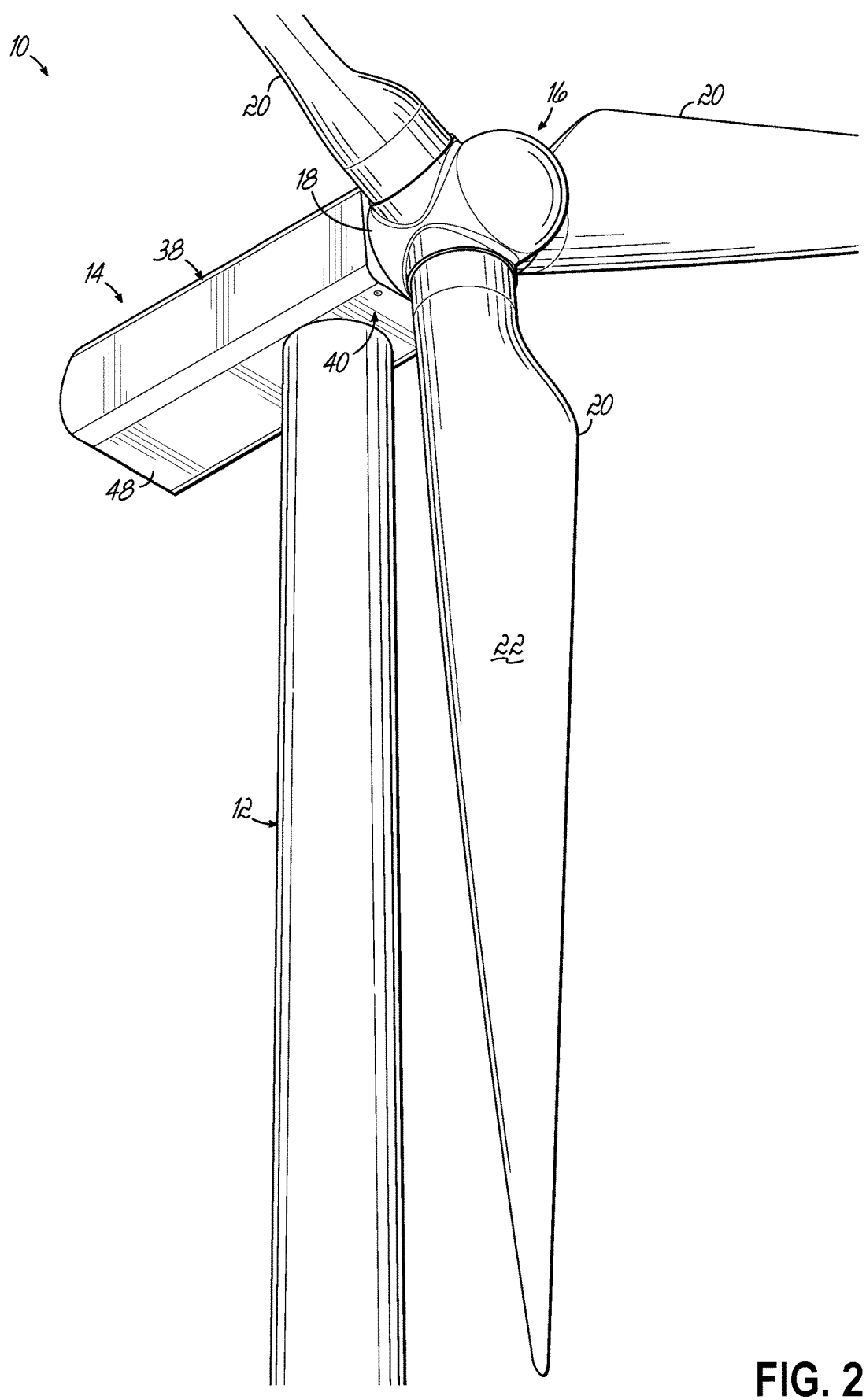
FIG. 2 is a perspective view of the wind turbine blade of FIG. 1 with the blade access system detached from the wind turbine and showing a nacelle connecting member.
Figure 3:
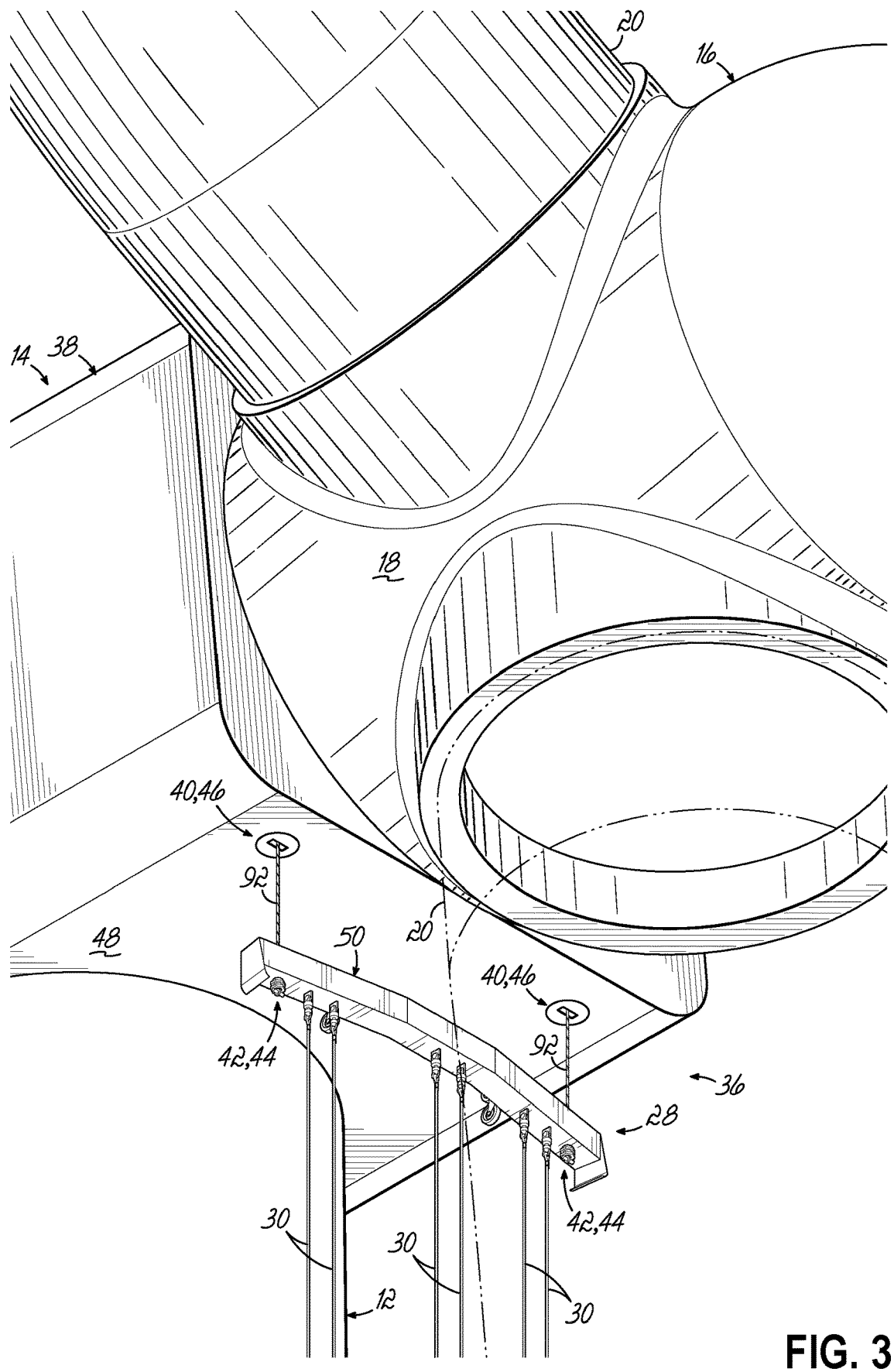
FIG. 3 is an enlarged perspective view of the wind turbine of FIG. 2 with the support frame of the blade access system being coupled to the nacelle of the wind turbine.

As discussed above, during the lifetime of the wind turbine 10, it may be necessary to service one or more of the blades 20 for inspection, maintenance, repair, and/or other purposes. As illustrated in FIGS. 1-3, during one of these procedures, the wind turbine blade 20 of interest may be oriented in the downward position (i.e., the 6 o'clock position) so as to be generally parallel to the wind turbine tower 12. With the wind turbine blade 20 in this position, service technicians or other personnel may access the blade 20, and more particularly the outer surface 22 of the blade 20, using a blade access system, generally shown at 24. The blade access system 24 includes a blade service platform 26, a support frame 28 configured to be coupled to the nacelle 14, and a plurality of lifting cables 30 configured to be coupled to the support frame 28 and operatively coupled to the blade service platform 26. Blade service platforms 26 usable with the blade access system 24 are not the particular focus of the present disclosure and are, in any event, generally known in the wind turbine industry. For example, Applicant's PCT Publication No. WO 2004/092577 discloses an exemplary blade service platform usable with blade access system 24. Other blade service platforms may also be used with the blade access system 24. Accordingly, a detailed discussion of the blade service platform 26 will be omitted from this description. The blade service platform 26 is operatively coupled to the plurality of lifting cables 30 in a known manner, such as via winches, and the details of the connection between the lifting cables 30 and the blade service platform 26 are also known and will be omitted as well.

Instead, the focus of the present invention includes a connection system 36 for attaching the support frame 28 of the blade access system 24 to the nacelle 14 of the wind turbine 10 in an improved manner. More particularly, aspects of the present invention are directed to a connection system 36 that provides selective attachment and detachment of the support frame 28 to and from the nacelle 14 in a quick, easy and repeatable manner, and without cutting holes in the outer housing 38 of the nacelle 14, which may be formed of fiberglass panels attached to a structural frame of the nacelle 14. In accordance with an aspect of the invention, the connection system 36 includes a nacelle connecting member 40 associated with the nacelle 14 and a support frame connecting member 42 associated with the support frame 28 that cooperate with each other to allow the support frame 28 to be coupled to the nacelle 14 in a quick connect/disconnect manner. In other words, the connection system 36 provides a quick connect coupling between the blade access system 24 (e.g., via support frame 28) and the nacelle 14. The connection system 36 allows repeated connections between the blade access system 24 and the nacelle 14 without cutting holes in the outer housing 38 of the nacelle.

The support frame connecting member 42 may include one of a lock element 44 or a lock receiver 46, and the nacelle connecting member 40 may include the other of the lock element 44 or the lock receiver 46. For example, in one embodiment the lock element 44 may be associated with the support frame 28 and the lock receiver 46 may be associated with the nacelle 14. In an alternative embodiment, however, the lock element 44 may be associated with the nacelle 14 and the lock receiver 46 may be associated with the support frame 28. At least one of the lock element 44 or the lock receiver 46 is movable relative to the other between an unlocked position and a locked position. For example, the lock receiver 46 may be fixed and the lock element 44 may be moveable. The relative movement may be one of sliding and/or rotation, for example. In the unlocked position, the lock element 44 may be freely received in and removed from the lock receiver 46. In the locked position, the lock element 44 may be fixed within the lock receiver 46 to prevent relative movement between the support frame 28 and the nacelle 14 in one or more degrees of freedom to thereby secure the support frame 28 to the nacelle 14.

In one aspect of the invention, the nacelle connecting member 40, whether that be the lock element 44 or the lock receiver 46, is accessible from an exterior of the nacelle 14 and forms a permanent part of the nacelle 14. In this way, for example, the nacelle 14 includes the necessary hardware to allow the blade access system 24, and more particularly the support frame 28 thereof, to be easily connected to and disconnected from the nacelle 14. The nacelle connecting member 40 is accessible from the external of the nacelle 14 and avoids repeatedly forming holes through the outer housing 38 of the nacelle 14 when using the blade access system 24. In this regard, FIG. 2 illustrates the nacelle 14 having the nacelle connecting member 40 integrated into the nacelle construction so as to be accessible at a lower wall 48 of the outer housing 38 of the nacelle 14 and forming a permanent part of the nacelle 14. Details of the connection system 36 and how the blade access system 24 connects to the nacelle 14 will be described in more detail below.

As illustrated in FIG. 3, for example, the blade access system 24, and the support frame 28 thereof more particularly, is configured to be selectively attached/detached to/from the nacelle 14 using the connection system 36. More particularly, in an exemplary embodiment, the support frame 28 is configured to be coupled to the lower wall 48 of the nacelle 13 adjacent to a front of the nacelle 14, i.e., near the rotor side of the nacelle 14, using the connection system 36. While the support frame 28 may be coupled to the nacelle 14 at various locations, the lower wall 48 is preferred given its proximity to the wind turbine blade 20 oriented in the downward position. As illustrated in FIGS. 3-6, in an exemplary embodiment, the support frame 28 includes an elongate anchor beam 50 having a central region 52 and opposed first and second ends 54, 56, respectively. In one embodiment, the anchor beam 50 may be substantially straight. In an alternative embodiment, the anchor beam 50 may be generally arcuate and formed from a plurality of straight beam segments, as illustrated in the figures. Other configurations of the anchor beam 50 are also possible, including a monolithic beam or a beam formed from separate sections coupled together, such as by welding. The anchor beam 50 may have a generally hollow construction with a generally square or rectangular cross-sectional profile in an exemplary embodiment. In an alternative embodiment, the anchor beam 50 may be solid in its construction. The anchor beam 50 may also have other cross-sectional profiles and configurations that remain within the scope of the present invention.

Figure 4:
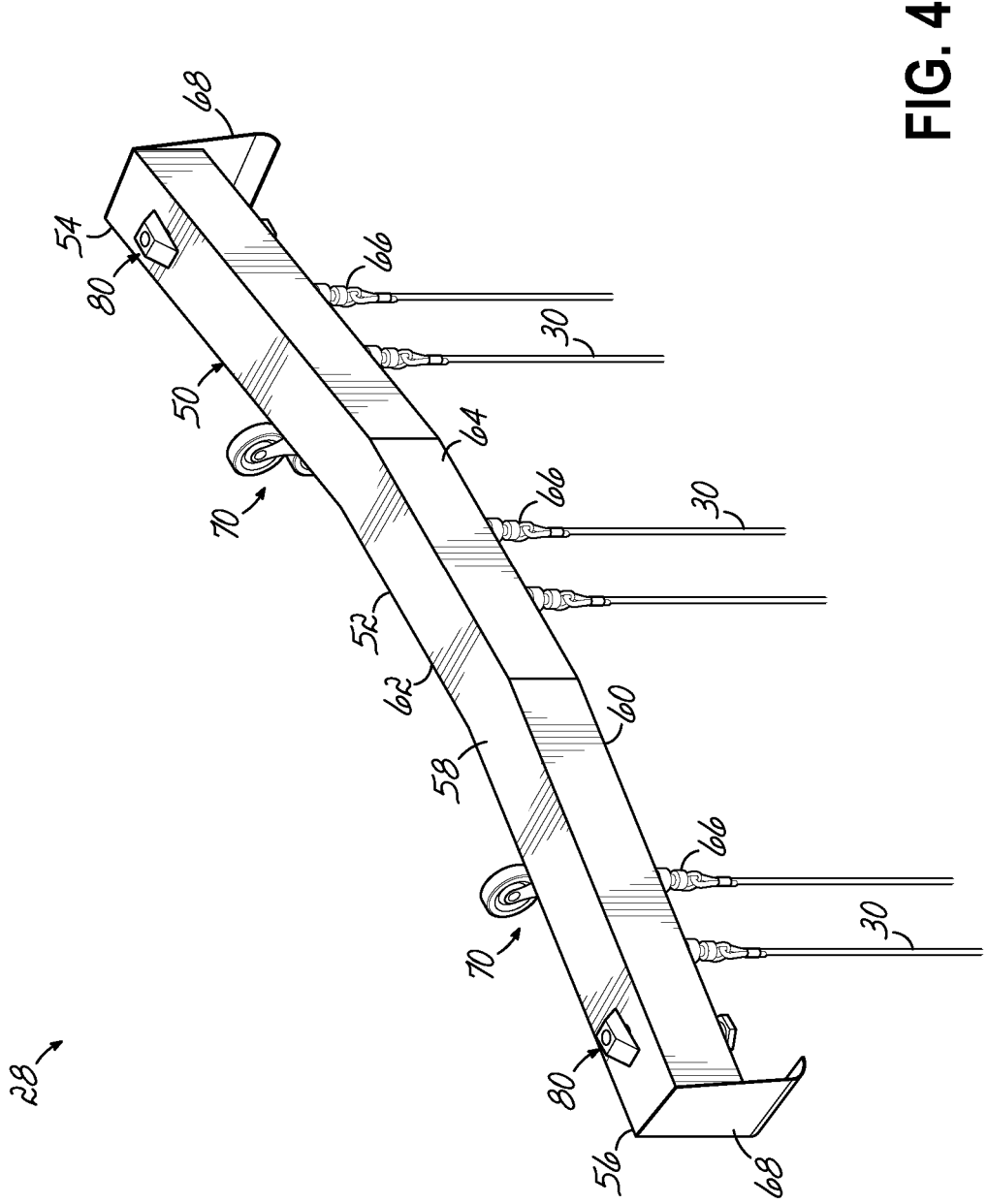
FIG. 4 is a perspective view of a support frame of the blade access system in accordance with one embodiment of the invention.

In an exemplary embodiment, the anchor beam 50 may be generally square in its cross section and include an upper wall 58, a lower wall 60, a rear wall 62 and a front wall 64. As illustrated in FIG. 3, when the support frame 28 is mounted to the nacelle 14, the upper wall 58 of the anchor beam 50 is configured to face the lower wall 48 of the nacelle 14, the lower wall 60 is configured to face away from the nacelle 14 and toward the ground or platform (generally referred to herein as the work surface), the rear wall 62 is configured to face toward the rear of the nacelle 14, and the front wall 64 is configured to face toward the front of the nacelle 14 that carries the rotor 16. The lifting cables 30 are configured to be coupled to the support frame 28. More particularly and as illustrated in FIG. 4, for example, the lifting cables 30 are configured to be coupled to the lower wall 60 of the anchor beam 50. To this end, the lifting cables 30 may be coupled to the tabs depending from anchor beam 50 via swivel connectors 66 that allow the lifting cables 30 to rotate relative to the anchor beam 50. In one embodiment, the swivel fasteners 66 may be releasably coupled to the anchor beam 50 so that the position of the lifting cables 30 may be adjusted to fit the particular arrangement of the blade service platform 26. For example, the swivel fasteners 66 may be threadably connected to the anchor beam 50. Other releasable fasteners may also be used to couple the swivel fasteners 66 to the anchor beam 50. Alternatively, the swivel fasteners 66 may be fixedly attached to the anchor beam 50 so that their positions along the beam are not generally adjustable. Additionally, the lifting cables may be coupled to the anchor beam 50 through other types of releasable or fixed type connectors.

In one embodiment, the support frame 28 may further include one or more feet 68 to support the frame 28 on the work surface. In addition to generally supporting the support frame 28 on the work surface, the one or more feet 68 are also configured to space the anchor beam 50 from the work surface to allow the lifting cables 30 to be connected thereto. In an exemplary embodiment, and as illustrated in the drawings, the anchor beam 50 includes a pair of feet 68 connected to the opposed first and second ends 54, 56 of the anchor beam 50. When so configured, the anchor beam 50 may be stably arranged on the work surface and the lower wall 60 thereof is sufficiently spaced from the work surface to allow the swivel fasteners 66 and lifting cables 30 to be connected thereto.

Figure 5:
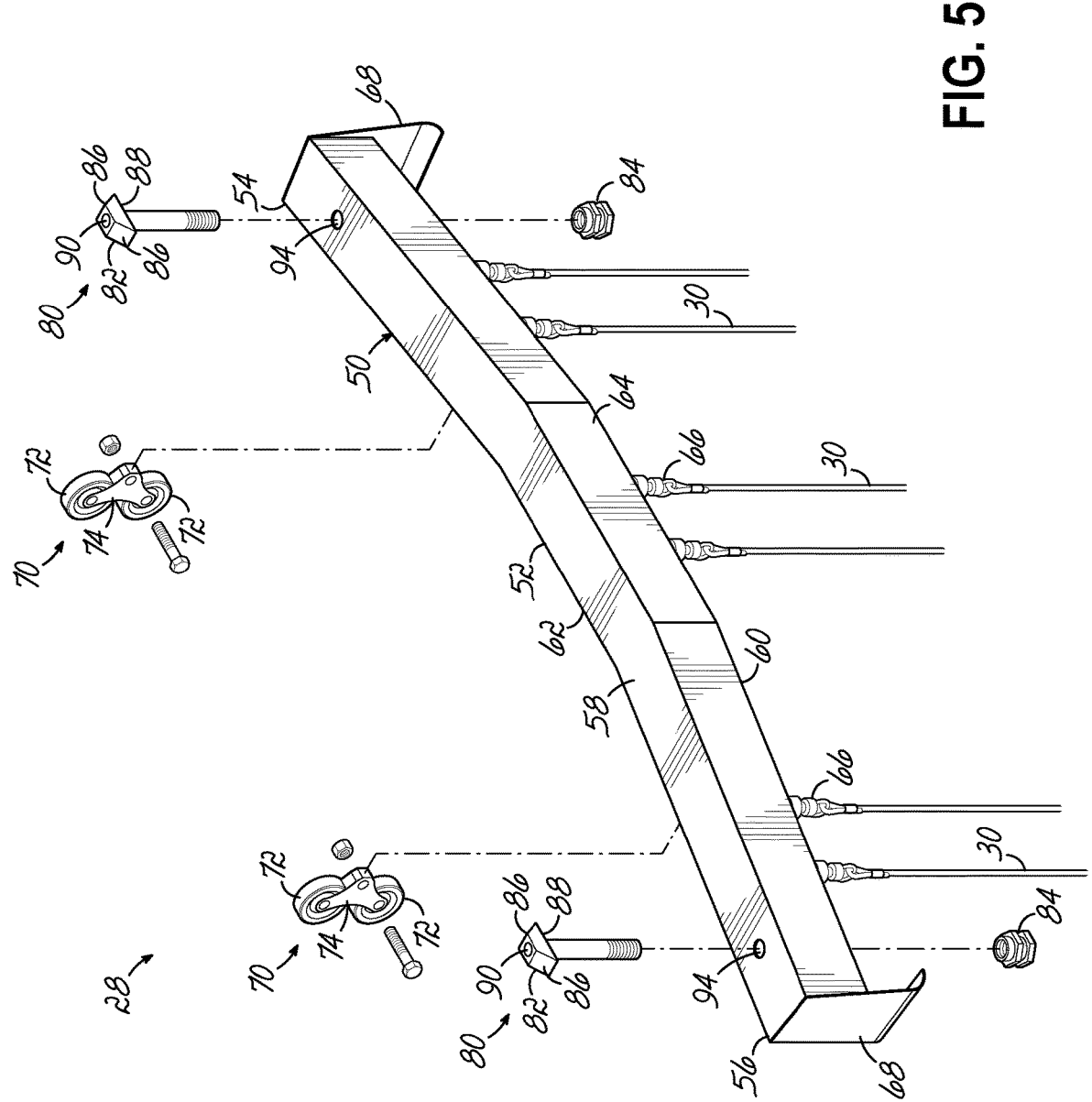
FIG. 5 is a top, partially disassembled perspective view of the support frame shown in FIG. 4.
Figure 6:
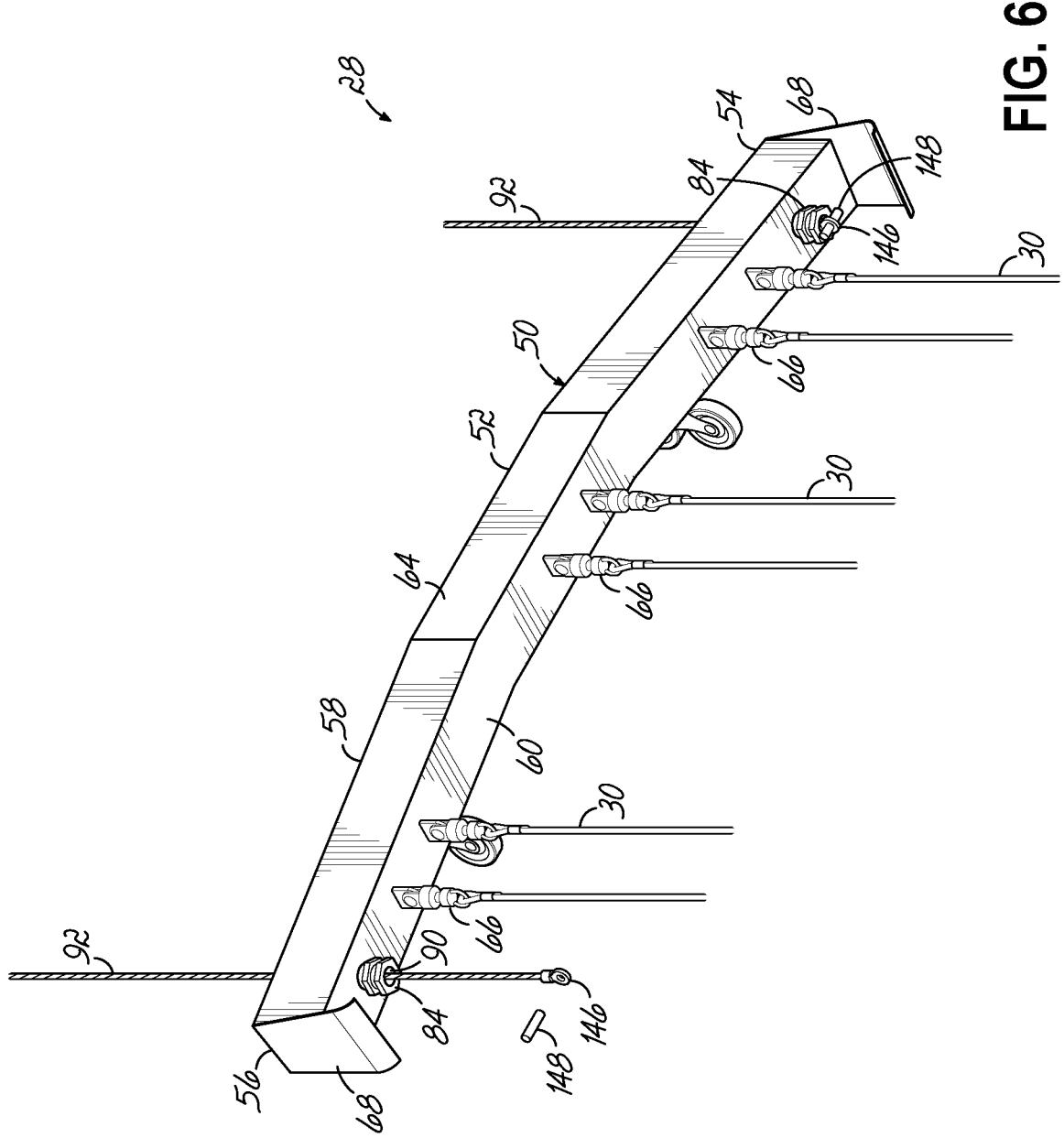
FIG. 6 is bottom perspective view of the support frame shown in FIG. 4 shown with pilot cables for hoisting the support frame to the nacelle.
Figure 8:
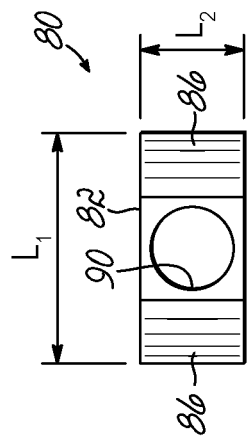
FIG. 8 is a top view of the support frame connecting member shown in FIG. 7.
Figure 7:
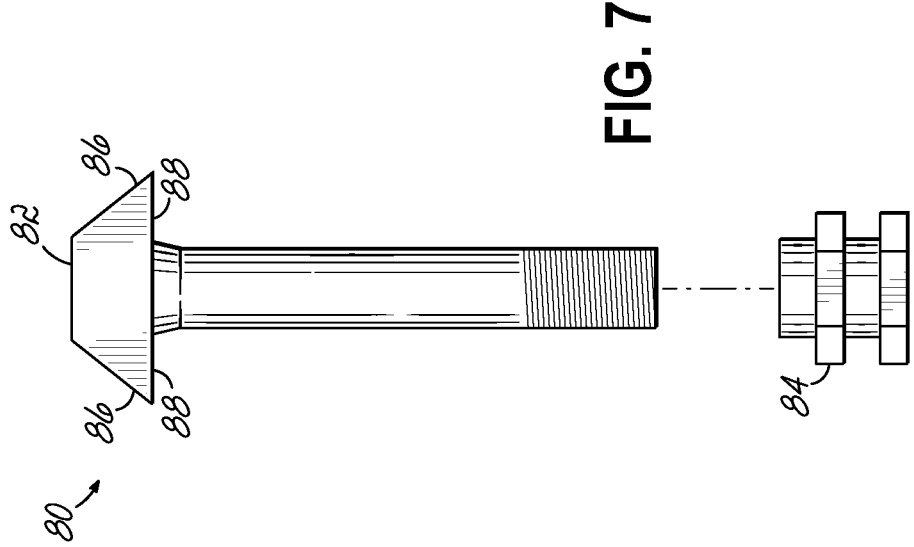
FIG. 7 is a disassembled side view of a support frame connecting member in accordance with one embodiment of the invention.

In an exemplary embodiment, the support frame 28 may further include one or more tower guides 70 configured to engage with the tower 12 of the wind turbine 10 during the mounting/dismounting of the support frame 28 to/from the nacelle 14. By way of example, the figures illustrate two tower guides 70 associated with the support frame 28, but the number of tower guides 70 may vary depending on the application. In an exemplary embodiment, the one or more tower guides 70 may be coupled to the rear wall 62 of the anchor beam 50 so as to confront and engage the tower 12 during the mounting/dismounting of the support frame 28 to/from the nacelle 14. In one embodiment, each of the tower guides 70 may include one or more roller elements, such as a wheel 72. More particularly, as illustrated in FIGS. 4-6, each of the one or more tower guides 70 may include a wheel carriage 74 having a plurality of wheels 72 (two shown), the carriage 74 being coupled to the rear wall 62 of the anchor beam 50. In this regard, the wheel carriage 74 may be coupled to the anchor beam 50 via a threaded or other suitable connection, such as at a clevis (not shown). During lifting of the anchor beam 50 from the work surface to the nacelle 14, as will be explained in more detail below, the wheels 72 may be configured to engage with and roll along the outer surface of the tower 12, thereby supporting and guiding the anchor beam 50 as it is being lifted toward the nacelle 14. During lowering of the anchor beam 50 from the nacelle 14 to the work surface, the wheels 72 may also engage with and roll along the outer surface of the tower. While the above describes the one or more tower guides 70 as including wheels 72, it should be appreciated that the tower guides 70 may take other forms that support and guide the anchor beam 50 during mounting to/dismounting from the nacelle 14. For example, the one or more tower guides 70 may include one or more low-friction bearing pads or other rolling and/or sliding elements. Thus, aspects of the tower guides 70 should not be limited to wheel-based assemblies as shown and described herein.

As discussed above, the support frame 28 includes one part of the connection system 36 for attaching the support frame 28 to the nacelle 14. More particularly, the support frame 28 includes at least one support frame connecting member 42, which cooperates with a corresponding at least one nacelle connecting member 40 to selectively attach and detach the support frame 28 to/from the nacelle 14. As also discussed above, the support frame connecting member 42 may include a lock element 44 that cooperates with the at least one nacelle connecting member 40 that includes a lock receiver 46. In an exemplary embodiment, and as best illustrated in FIG. 5, for example, the lock element 44 includes an elongate, generally cylindrical lock pin 80 formed as an elongate shaft having a head 82 at a first end thereof and a removable lock nut 84 at an opposed second end thereof. By way of example, the lock nut 84 may be threadably attachable to the second end of the lock pin 80. Other releasable arrangements, however, may be possible. The head 82 of the lock pin 80 includes a pair of pawls 86 extending from opposed sides of the lock pin 80, such that the head 82 has a first length $L_1$ in a first direction and a second length $L_2$ in a second direction generally perpendicular to the first direction and less than the first length $L_1$. The purpose of this asymmetry in the configuration of the head 82 will be explained in more detail below. In any event, the pawls 86 define bearing surfaces 88, the purpose of which will also be explained in more detail below. Moreover, the lock pin 80 includes a passageway 90 extending through the lock pin 80 from the head 82 to the second end of the lock pin 80 that receives the lock nut 84. As explained in more detail below, the lock element 44 is configured to receive a pilot cable 92, shown in FIG. 6, for example, for lifting the anchor beam 50 from the work surface to the nacelle 14 prior to use of the blade access system 24.

As best illustrated in FIGS. 4 and 5, in an exemplary embodiment, the support frame 28 may include a plurality of lock elements, such as two lock elements 44, but the number of lock elements 44 may be more or less depending on the application. In one embodiment, the lock elements 44 may be positioned adjacent the first and second ends 54, 56, respectively, of the anchor beam 50. In an alternative embodiment, however, the lock elements 44 may be positioned along the central region 52 and/or other locations along the anchor beam 50. In this regard, the anchor beam 50 may include a plurality of openings 94 in the upper and lower walls 58, 60 in aligned pairs that allow the lock pins 80 to extend through the anchor beam 50 such that the head 82 is positioned adjacent the upper wall 58 of the anchor beam 50 and the lock nut 84 is positioned adjacent the lower wall 60 of the anchor beam 50. For example, with the lock nut 84 removed from the lock pin 80, the pin 80 may be inserted into an opening 94 in the upper wall 58 so that the threaded end of the lock pin 80 extends through an aligned opening 94 in the lower wall 60. The lock nut 84 may then be threaded onto the lock pin 80 to thereby secure the lock element 44 to the anchor beam 50 of the support frame 28.

In an exemplary embodiment, each of the lock elements 44 may be secured to the support frame 28 such that the lock elements 44 remain moveable relative to the support frame 28 in at least one degree of freedom. In this regard, in one embodiment, the lock nut 84 may be secured to the lock pin 80 such that lock pin 80 remains rotatable relative to the anchor beam 50 about its longitudinal axis. Additionally, the lock nut 84 may be secured to the lock pin 80 such that the distance between the bearing surfaces 88 of the head 82 and the upper surface of the lock nut 84 may be slightly greater than the distance between the upper and lower walls 58, 60 of the anchor beam 50. In this way, when the anchor beam 50 is lifted by the pilot cables 92, and the lock nuts 84 bear against the lower wall 60 of the anchor beam 50, a gap is formed between the heads 82 of the lock pins 80 and the upper wall 58 of the anchor beam 50 (e.g., see FIG. 15). In an alternative embodiment (not shown), the gap between the head 82 of the lock pin 80 and the upper wall 58 of the anchor beam 50 may be formed by a cylindrical spacer extending radially about the lock pin 80 immediately below the bearing surfaces 88. In this alternative embodiment, the lock nut 84 may be fully tightened such that the bottom side of the spacer contacts the upper wall 58 of the anchor beam 50 and the gap is formed between the heads 82 of the lock pins 80 and the upper wall 58 of the anchor beam 50. As explained below, this gap aids in engaging the lock elements 44 associated with the support frame 28 with the lock receivers 46 associated with the nacelle 14.

Figure 9:
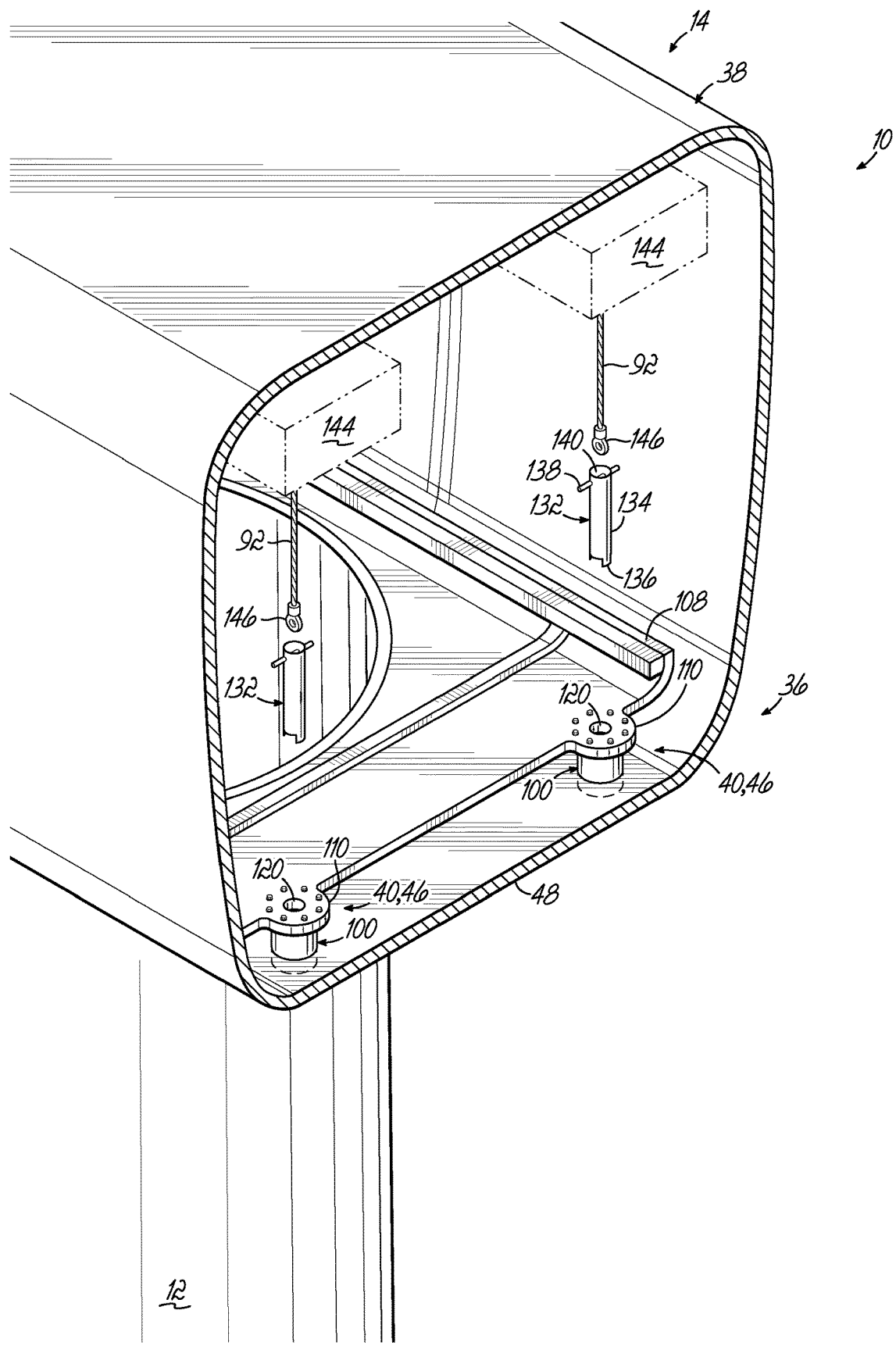
FIG. 9 is a partially torn away front perspective view of the nacelle of the wind turbine of FIG. 1 including nacelle connecting members in accordance with an embodiment of the invention.

As discussed above, the nacelle 14 also includes one part of the connection system 36 for attaching/detaching the support frame 28 to the nacelle 14. More particularly, the nacelle 14 includes at least one nacelle connecting member 40 which cooperates with at least one support frame connecting member 42 to selectively attach and detach the support frame 28 to and from the nacelle 14. As also discussed above, in an exemplary embodiment, the at least one nacelle connecting member 40 may include a lock receiver 46 that cooperates with the at least one support frame connecting member 42 that includes the lock element 44. In an exemplary embodiment, and as illustrated in FIGS. 9-13, the lock receiver 46 includes a generally tubular or cylindrical socket 100 having an upper end 102, a lower end 104 and a passageway 106 extending between the upper and lower ends 102, 104. To provide sufficient structural support for the blade access system 24, including the support frame 28, the lock receiver 46 is configured to couple to a structural part of the nacelle 14, as opposed to the relatively weaker outer housing 38 thereof. For example, and as illustrated in FIG. 9, the lock receiver 46 may be configured to be coupled to the bed plate 108 of the nacelle 14. It should be recognized, however, that the lock receiver 46 may be coupled to another structural part of the nacelle 14 and remain within the scope of the present invention.

In an exemplary embodiment, the bed plate 108 may include one or more lugs 110 integrally formed with the bed plate 108 (e.g., cast bed plate) and configured to be coupled to respective lock receivers 46. To this end, the upper end 102 of the sockets 100 may include a radial flange 112 (see FIGS. 14-19) having a plurality of openings 114 circumferentially spaced along the flange 112, and the lugs 110 may similarly include a plurality of circumferentially spaced openings 116 configured to align with the flange openings 114 when the sockets 100 engage and are oriented relative to the lugs 110. Bolts 118 may be used to connect the sockets 100 to the lugs 110 of the bed plate 108. While bolts 118 are used to connect the sockets 110 to the bed plate 108 of the nacelle 14, other fastening means, such as welding, may alternatively be used to connect the sockets 100 to the lugs 110 of the bed plate 108 and aspects of the invention should not be limited to a bolted connection. For purposes described in more detail below, the one or more lugs 110 include a main opening 120 in communication with the passageway 106 of the sockets 100 when the sockets 100 are coupled to the lugs 110. In this way, the passageway 106 of the sockets 100 may be accessible from an interior of the nacelle 14. In one embodiment, the main opening 120 in the lugs 110 may be smaller than the passageway 106 of the sockets 100. To provide strength, the sockets 100 are preferably made of metal, such as steel, but other materials might also be possible in alterative embodiments.

As noted above, in one aspect of the invention, the lock receivers 46 are configured to be accessible from an exterior of nacelle 14. Accordingly, the sockets 100 are configured to have a length such that the lower ends 104 of the sockets 100 are accessible from the exterior of the nacelle 14. More particularly, the length of the sockets 100 are such that the lower ends 104 are either flush with the exterior surface of the outer housing 38 (e.g. lower wall 48), or perhaps more preferably, extend slightly beyond the exterior surface of the outer housing 38. When the sockets 100 extend slightly beyond the exterior surface of the outer housing 38, then during the mounting of the support frame 28 to the nacelle 14, the support frame 28 is configured to avoid contact with the outer housing 38 of the nacelle 14 and instead makes contact with the lower ends 104 of the sockets 100. In this way, the chances of damaging the nacelle 14 while mounting the support frame 28 is minimized or eliminated. When the sockets 100 are flush with the exterior surface of the outer housing 38, additional care must be taken during the mounting process to avoid excessive contact between the support frame 28 and the outer housing 38 of the nacelle 14. In any event, the sockets 100 are configured to span the distance between the outer housing 38 of the nacelle 14 and the structural portions of the nacelle 14, such as the bed plate 108. Thus, the structural aspects of the nacelle 14 (e.g., the bed plate 108) may be accessed from the exterior of the nacelle 14 without having to repeatedly cut or otherwise form holes through the outer housing 38.

As perhaps best illustrated in FIGS. 14-19, the lower end 104 of the sockets 100 include an end plate 122 defining an opening or keyway 124 open to the passageway 106 of the socket 100. The keyway 124 may be configured to have an asymmetric configuration. More particularly, the keyway 124 in the end plate 122 is configured to have a shape that generally corresponds with the shape of the head 82 of the lock pin 80. When the lock pin 80 has an aligned orientation (which may correspond to one or more rotational positions of the lock pin 80 about its axis), the head 82 of the lock pin 80 is permitted to pass through the keyway 124 and be received in the passageway 106 of the socket 100. When the lock pin 80 is in a non-aligned orientation, the lock pin 80 is not permitted to pass through the keyway 124 and into the passageway 106 of the socket 100. Thus, the lock pins 80 are only permitted to be received within corresponding sockets 100 when the lock pins 80 have a certain orientation relative to the keyway 124 of the sockets 100. The position of the lock pin 80 relative to the socket 100 when in an aligned position is referred to herein as the unlocked position. In the unlocked position, the heads 82 of the lock pins 80 are able to pass through the keyways 124 of the socket 100.

In an exemplary embodiment, the keyway 124 of the sockets 100 may be configured as a generally rectangular slot 126 having a first length in a first direction (slightly greater than $L_1$) and a second length in a second direction generally perpendicular to the first direction (slightly greater than $L_2$) with the second length being less than the first length. When the pawls 86 of the heads 82 of the lock pins 80 are aligned with the long direction of the slots 126, the heads 82 are able to pass through the slots 126, thus allowing the lock pins 80 to be received in the passageways 106 of the sockets 100. When the pawls 86 of the heads 82 of the lock pins 80 are not aligned with the long direction of the slots 126, the heads 82 are not able to pass through the slots 126, thus blocking the lock pins 80 from being received in the sockets 100. It should be understood that aspects of the invention are not limited to the keyway 124 being configured as a rectangular slot 126. In alternative embodiments, for example, the heads 82 of the lock pins 80 and the keyways 124 of the sockets 100 may have a wide variety of shapes and arrangements so long as they allow passage of the lock pins 80 into the sockets 100 when in a first relative position and block passage of the lock pins 80 into the sockets 100 when not in the first relative position. Thus, the keyways 124 are not limited to just a slot configuration as shown and described herein.

In a further aspect of the connection system 36, once the lock pins 80 are received in the passageways 106 of the sockets 100, the lock pins 80 remain moveable (e.g., rotatable) relative to the sockets 100 so as to move the lock pins 80 out of the aligned position and into a non-aligned position. When a lock pin 80 is rotated to a non-aligned orientation, the heads 82 of the lock pins 80 are blocked from passing back out of the keyways 124 in the end plates 122 of the sockets 100, thereby trapping the heads 82 within the sockets 100. Thus, the lock pins 80 are locked to the sockets 100. The position of the lock pins 108 relative to the sockets 100 when in a non-aligned position is referred to herein as the locked position. As noted above, the keyways 124 may be configured as a slot 126. When the lock pins 80 are in the locked position, the pawls 86 of the heads 82 no longer align with the long dimension of the slots 126 but instead overlie the upper surface 128 of the end plate 122. More particularly, the pawls 86 of the heads 82 of the lock pins 80, and even more particularly the bearing surfaces 88 thereof, are configured to engage with the upper surface 128 of the end plates 122 to support the loads presented by the blade access system 24 during use.

In an exemplary embodiment, the upper surface 128 of the end plates 122 may include one or more bosses 130 configured to limit the degree of rotation of the lock pins 80 relative to the sockets 100 after the heads 82 of the lock pins 80 have passed through the keyways 124. By way of example and without limitation, the one or more bosses 130 may be positioned to limit the relative rotation between the lock pins 80 and the sockets 100 to less than or equal to about ninety degrees. This will maximize the area of the bearing surfaces 88 that engage with the upper surface 128 of the end plates 122.

In a further aspect of the connection system 36, the rotation of the lock pins 80 relative to the sockets 100 between the unlocked position and the locked position may be achieved through the interior of the nacelle 14. This obviates the need to have personnel external to the nacelle 14 to effectuate the connection between the support frame 28 of the blade access system 24 and the nacelle 14 of the wind turbine 10. Instead, the connection between the support frame 28 of the blade access system 24 and the nacelle 14 may be achieved with personnel positioned within the interior of the nacelle 14. To this end, the connection system 36 may include one or more keys 132 for turning the lock pins 80 from the unlocked position to the locked position (and vice versa). In an exemplary embodiment, and as illustrated in FIGS. 14-19, the key 132 may include an elongate body 134 having a first end defining a pin interface 136, a second end defining a grip portion 138, and a passageway 140 extending between the first and second ends. The elongate body 134 may be sized so as to fit within the main opening 120 of the one or more lugs 110, and thereby access the heads 82 of the lock pins 80 within the passageways 106 of the sockets 100. The pin interface 136 is configured to engage the head 82 of the lock pin 80 such that rotation of the key 132 causes a corresponding rotation of the lock pin 80 when so engaged. In one embodiment, for example, the key interface 136 may include a pair of opposed slots open to the end of the body 134 and configured to snugly receive the head 82 of the lock pin 80 therein. It should be understood, however, that the key interface 136 may have a wide variety of configurations depending on the configuration of the head 82.

In one embodiment, the keys 132 may be configured to be manually rotated and the grip portion 138 may be configured to be engaged by a technician, for example. In another embodiment, the keys 132 may be configured to be turned with a tool and the grip portion 138 may be configured to interface with that tool.

To prevent the ingress of water and other debris into the interior of the nacelle 14, the connection system 36 may further include a cover (not shown). In one embodiment, the cover may take the form of a plug that resides within the main opening 120 of the one or more lugs 110 to occlude passage through the lugs 110. Alternatively, the cover may include a cap that resides on top of the lugs 110 to overlie the main openings 120. Still further, the cover may include a hinged door or shutter overlying the keyways 124 in the end plate 122 of the sockets 100 that is biased toward a closed position and only moves to an open position by engagement with a lock pin 80. No matter what the design, the cover should automatically open when engaged by a lock pin 80 or be selectively removable from within the interior of the nacelle 14 when using the blade access system 24. Furthermore, a seal or other occluding member (not shown) may also be positioned between an outer wall of the socket 100 and the inner periphery of the opening in the outer housing 38 through which the socket 100 is positioned.

Having described the connection system 36 in detail above, a description of how the connection system 36 may be used to connect the support frame 28 of the blade access system 24 to the nacelle 14 of the wind turbine 10 will be made in reference to FIGS. 9-19. For purposes of this description, it should be kept in mind that the lock receivers 46 associated with the nacelle 14 are configured to be a permanent part of the nacelle construction. For example, the inclusion of the lock receivers 46 may be part of the original manufacturing of the nacelle 14 or may be from a one-time retrofit of an existing wind turbine 10. In any event, when it is desired to service a blade, such as by performing an inspection, maintenance, repair or other process on a blade 20, the rotor 16 of the wind turbine 10 may be rotated until the desired blade 20 is pointing in the downward direction substantially parallel with the tower 12. The support frame 28 of the blade access system 24, which may have been hauled to the wind turbine site by a truck or ship, may be positioned on the work surface underneath the desired blade 20 and adjacent the base of the tower 12. As discussed above, the support frame 28 may be supported on the work surface by one or more feet 68. The lifting cables 30 may be coupled to the anchor beam 50 of the support frame 28, such as by the swivel fasteners 66, while the support frame 28 is on the work surface, and the feet 68 raise the anchor beam 50 off the work surface some amount to facilitate attachment of the lifting cables 30.

As illustrated in FIGS. 9-12, one or more winches 144 may be positioned in the nacelle 14 and in proximity to one or more of the lugs 110 in the bed plate 108 of the nacelle 14. More particularly, respective winches 144 may be positioned generally above the lugs 110 so that pilot cables 92 associated with the winches 144 may be generally aligned with the main openings 120 therein. In one embodiment, the winches 144 may form a permanent part of the nacelle 14 of the wind turbine 10. In an alternative embodiment, however, the winches 144 may be temporary and brought up to the nacelle 14 and secured thereto for the specific purpose of conducting the inspection, maintenance and/or repair using the blade access system 24. In any event, the winches 144 are configured to pay out and reel in respective pilot cables 92 and are weight rated to collectively support at least the support frame 28 (not necessarily the entire blade access system 24) during lifting of the support frame 28 to the nacelle 14.

Figure 10:
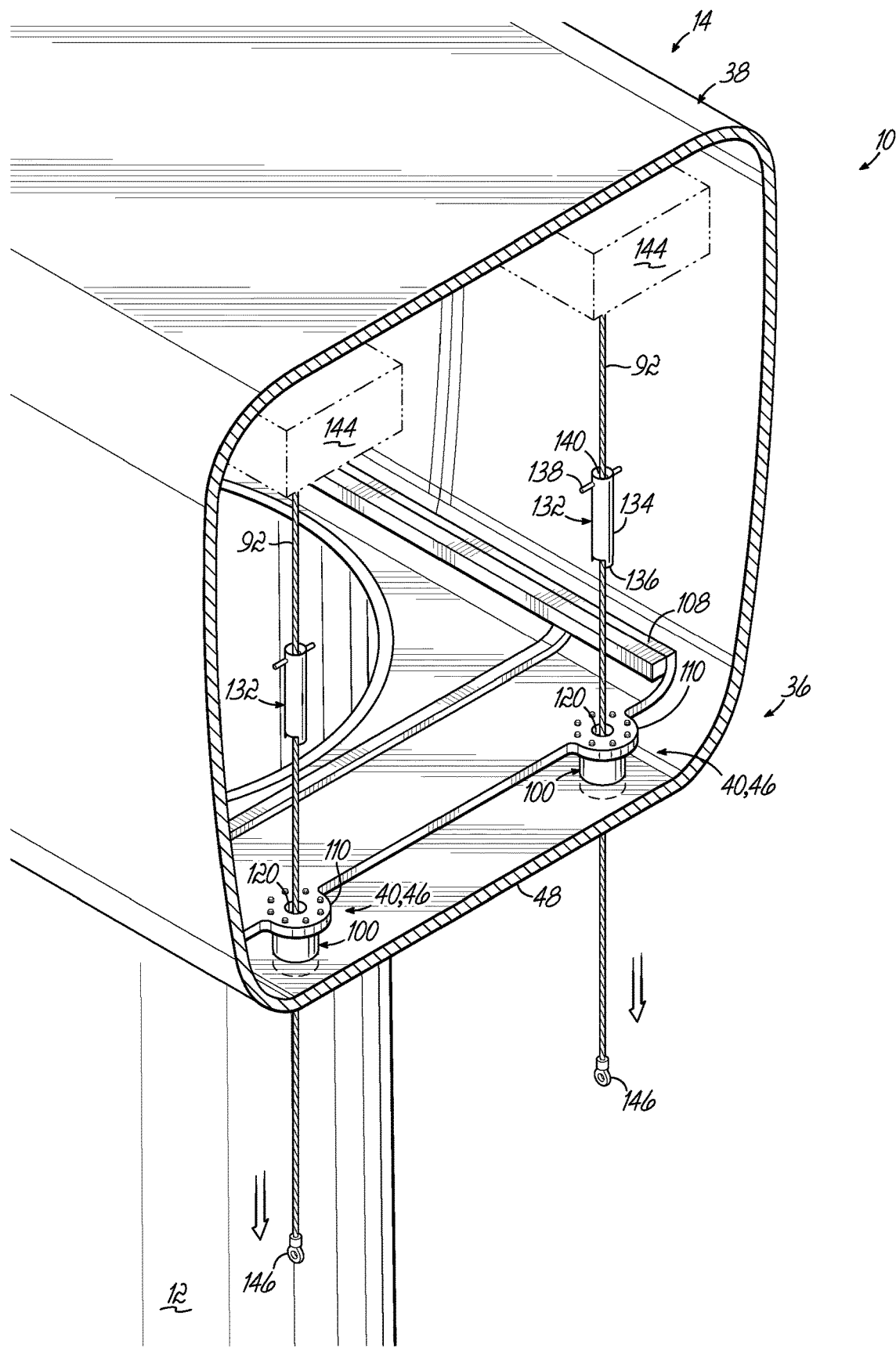
FIG. 10 is another partially torn away front perspective view of the nacelle of the wind turbine of FIG. 1 including nacelle connecting members and pilot cables.

As illustrated in FIGS. 9 and 10, the ends 146 of the pilot cables 92 are threaded through the passageway 140 of the keys 132 so that the keys 132 are disposed about the cables 92 but remain slidable relative to the keys 132. The ends 146 of the pilot cables 92 are then inserted through the main openings 120 in the lugs 110, through the passageway 106 and keyway 124 of the sockets 100, and out of the nacelle 14. The winches 144 may be activated to lower the ends 146 of the pilot cables 92 toward the work surface, as demonstrated by the arrows in FIG. 10. From here, the ends 146 of the pilot cables 92 may be coupled to the support frame 28. More particularly, and in another aspect of the present invention, the pilot cables 92 may be configured to couple to the lock elements 44 on the support frame 28. In this way, as the support frame 28 is being raised toward the nacelle 14 by the winches 144, the lock elements 44 automatically become aligned with the lock receivers 46 on the nacelle 14, through which the pilot cables 92 extend. In other words, because the pilot cables 92 extend through both the lock receivers 46 on the nacelle 14 and the lock elements 44 on the support frame 28, these features become self-aligned as a result of the lifting process. Thus, personnel do not have to be external to the nacelle 14 to align the connecting members 40, 42 of the connection system 36.

In one embodiment, to couple the pilot cables 92 to the lock elements 44, the ends 146 of the pilot cables 92 are inserted through the passageway 90 of the lock pins 80. Once the pilot cables 92 are fed through the lock pins 80, a selectively removable occluding member 148 may be attached to the ends 146 of the pilot cables 92 to prevent their movement back through the passageway 90 of the lock pins 80. Before the support frame 28 is hoisted off the work surface, the lock pins 80 may be rotated to an unlocked position. This may be achieved manually or with the use of a suitable tool. In any event, the pilot cables 92 are now coupled to the support frame 28 and the winches 144 may be activated to reel in the pilot cables 92 and raise the support frame 28 upwardly along the tower 12 toward the nacelle 14.

Figure 11:
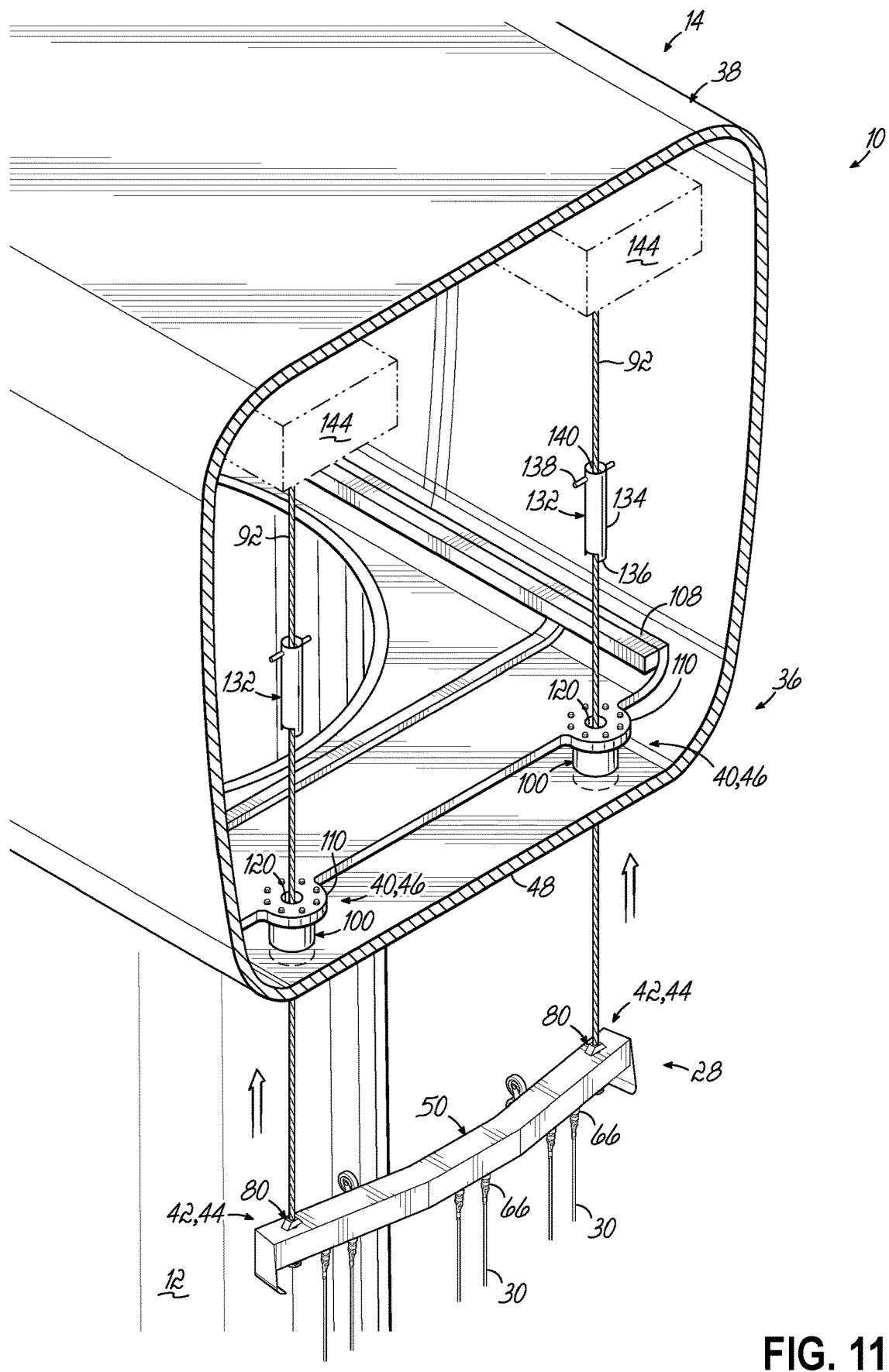
FIG. 11 is another partially torn away front perspective view of the nacelle of the wind turbine of FIG. 1 including nacelle connecting members, pilot cables, and the support frame.
Figure 12:
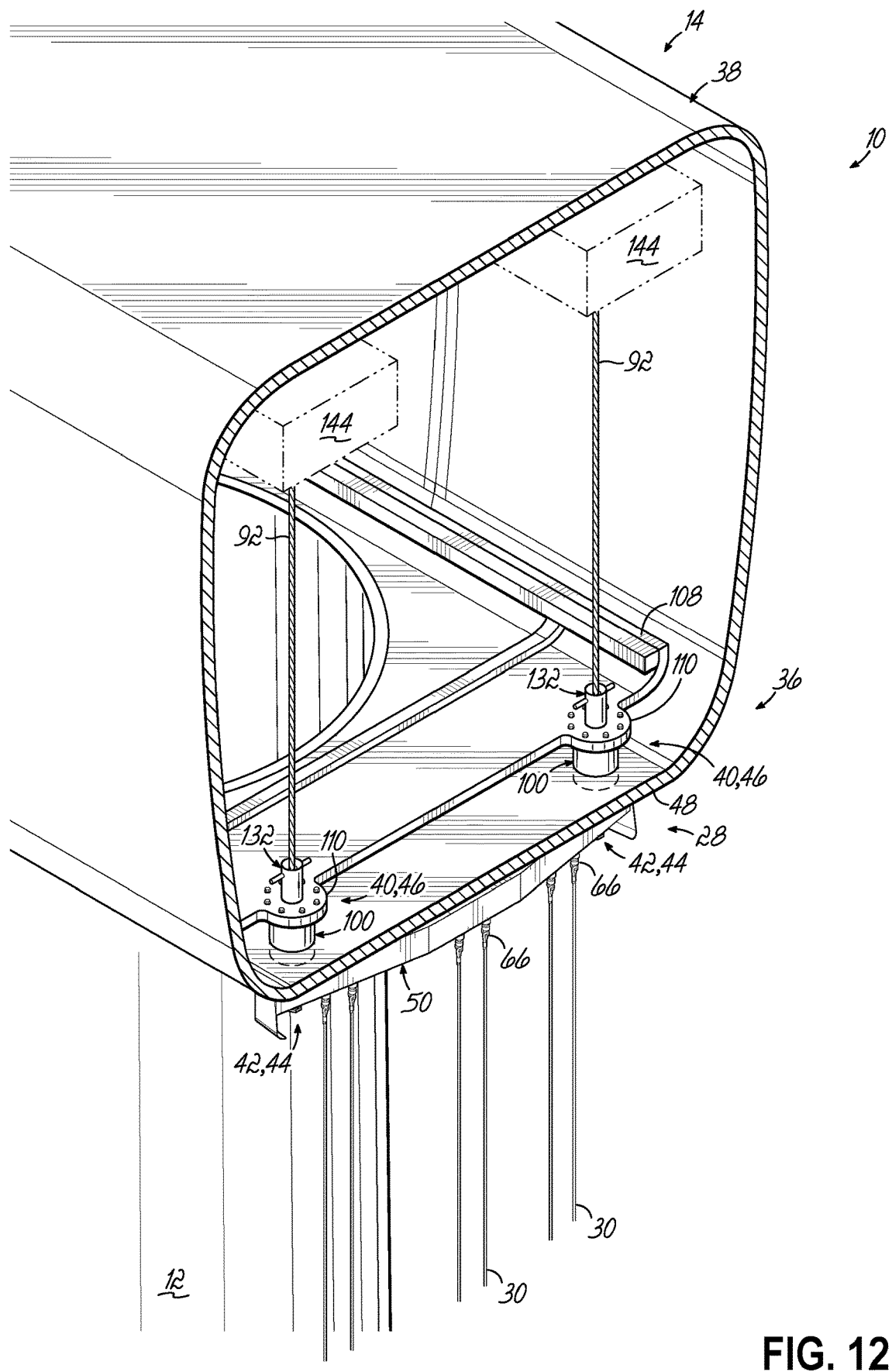
FIG. 12 is another partially torn away front perspective view of the nacelle of the wind turbine of FIG. 1 including nacelle connecting members, pilot cables, and the support frame, with the support frame mounted to the nacelle.
Figure 13:
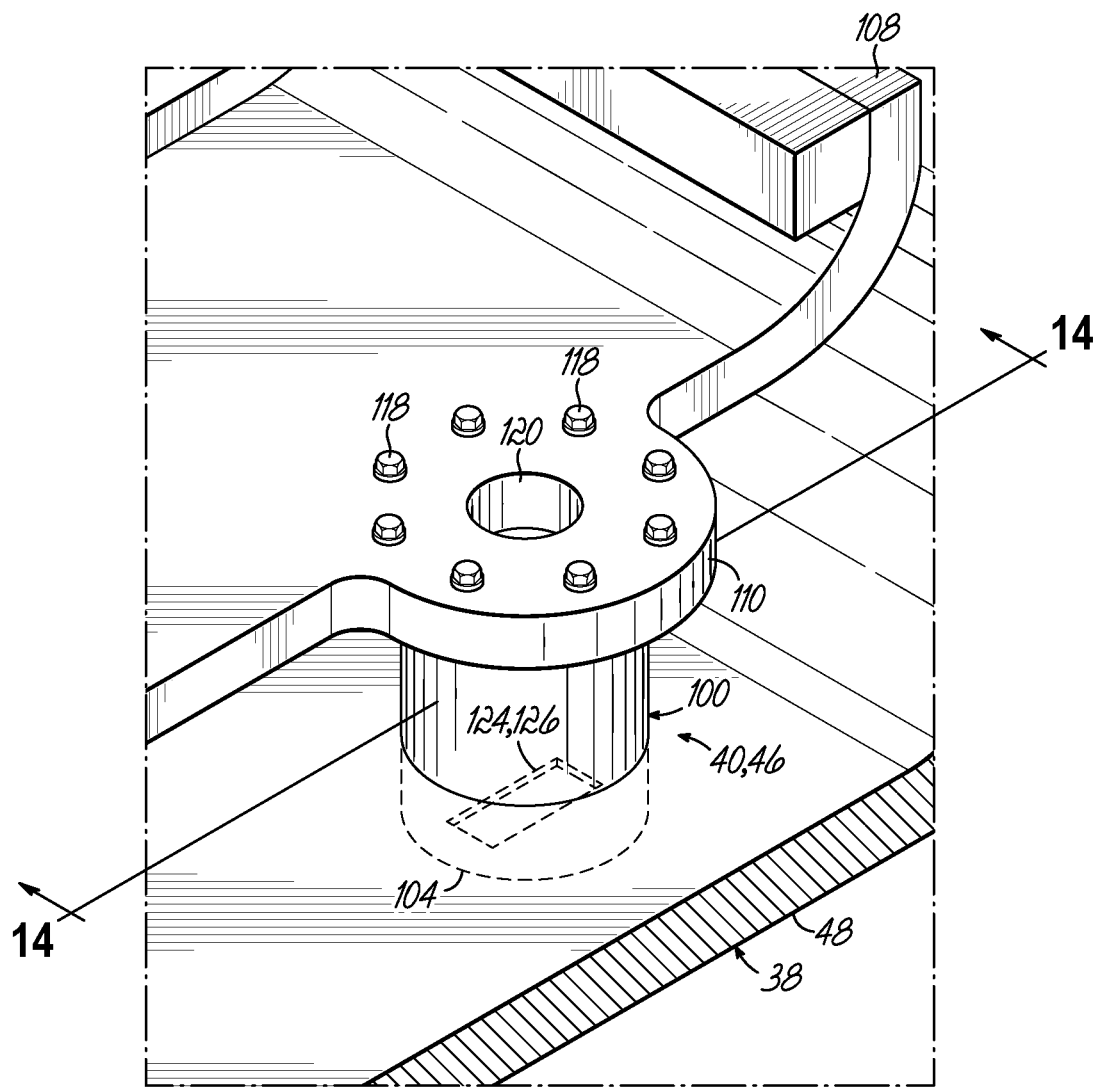
FIG. 13 is an enlarged perspective view of the nacelle connecting member shown in FIG. 9.
Figure 14:
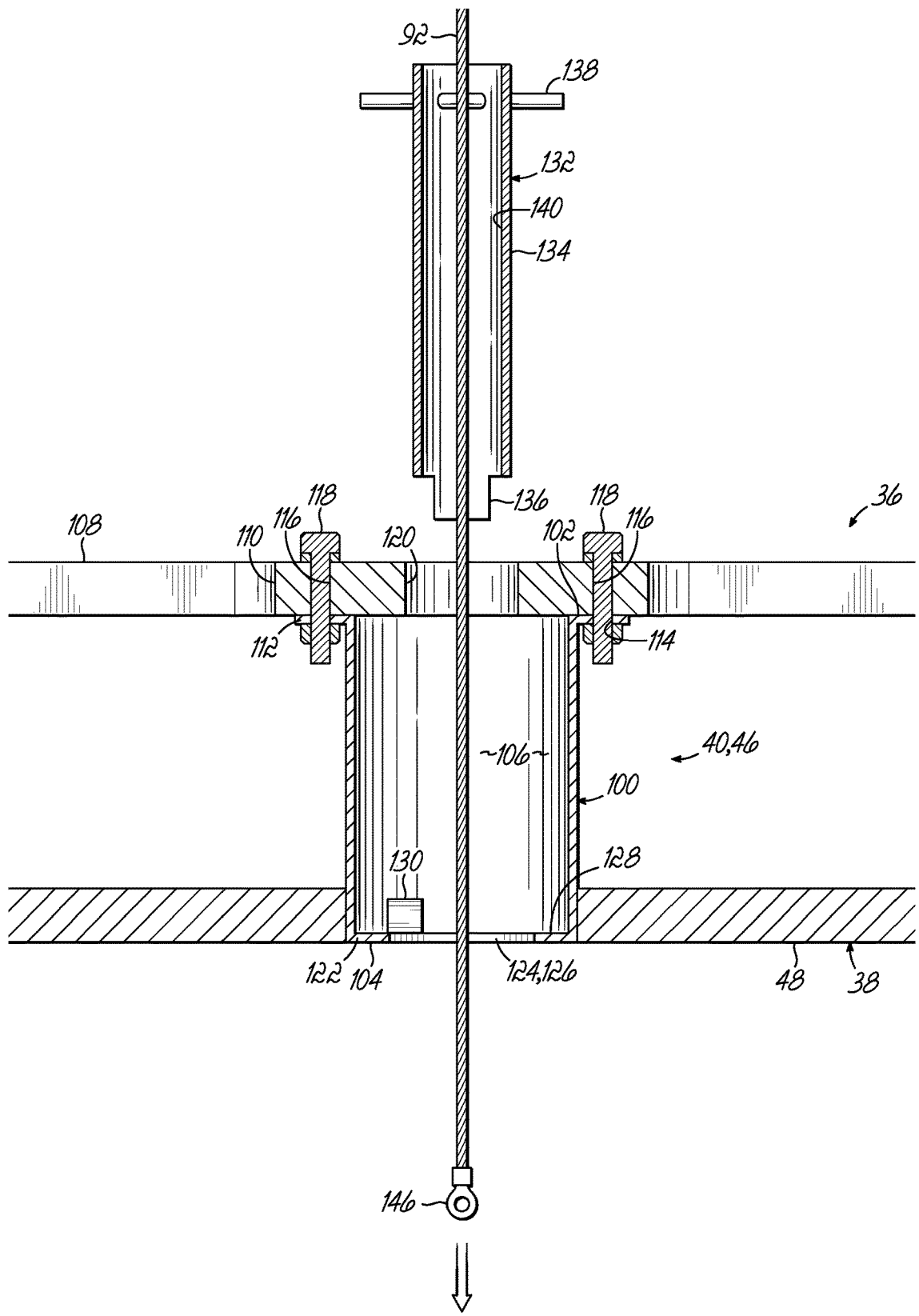
FIGS. 14-19 are illustrative sequential cross-sectional views showing the connection of a support frame connecting member and a nacelle connecting member to attach the support frame of the blade access system to the nacelle of the wind turbine.

FIG. 11, for example, illustrates the support frame 28 as it is being raised and approaching the lower wall 48 of the nacelle 14. The tower guides 70 may contact the tower 12 as the support frame 28 is being raised toward the nacelle 14.

Figure 15:
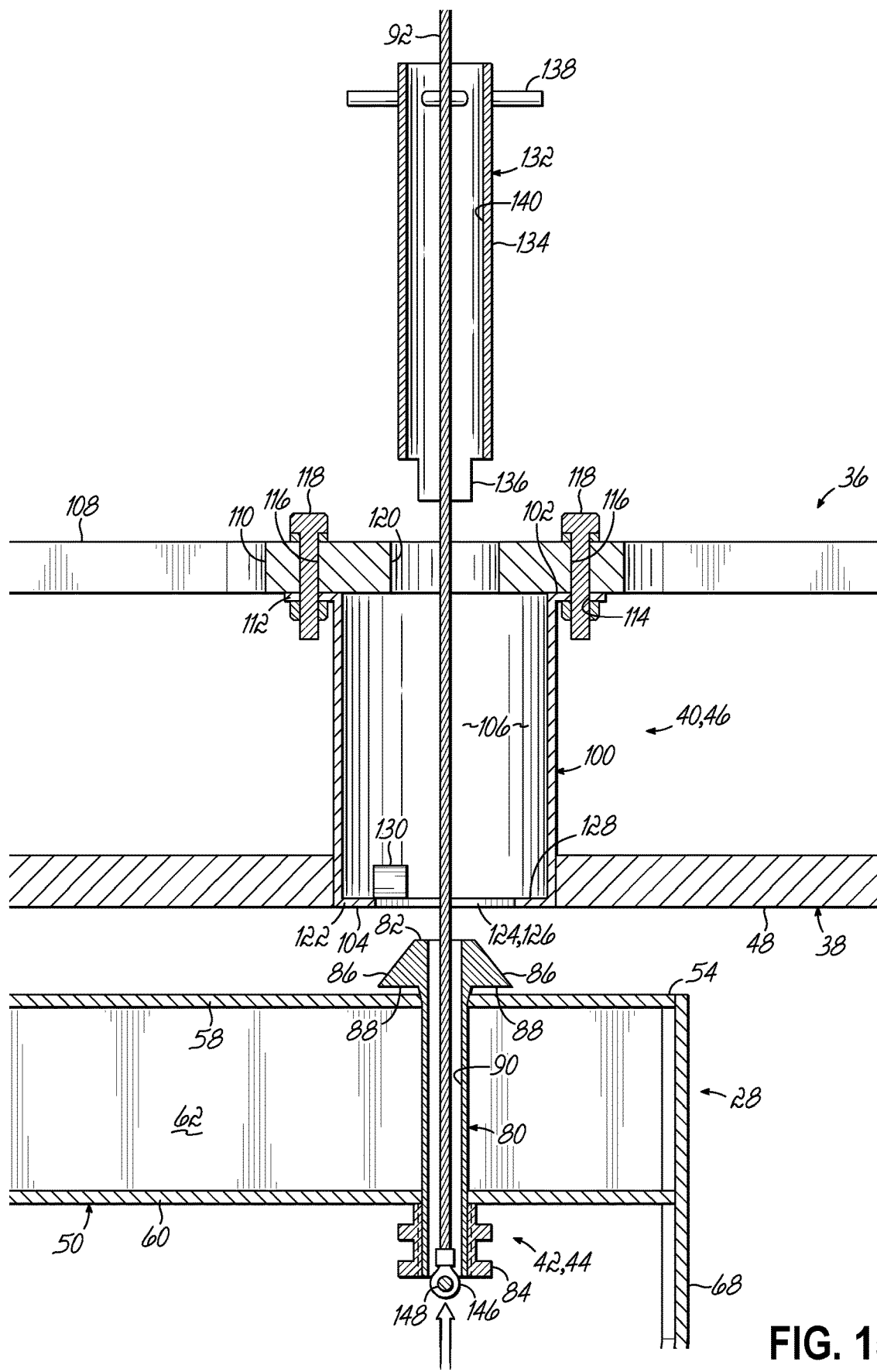
Figure 16:
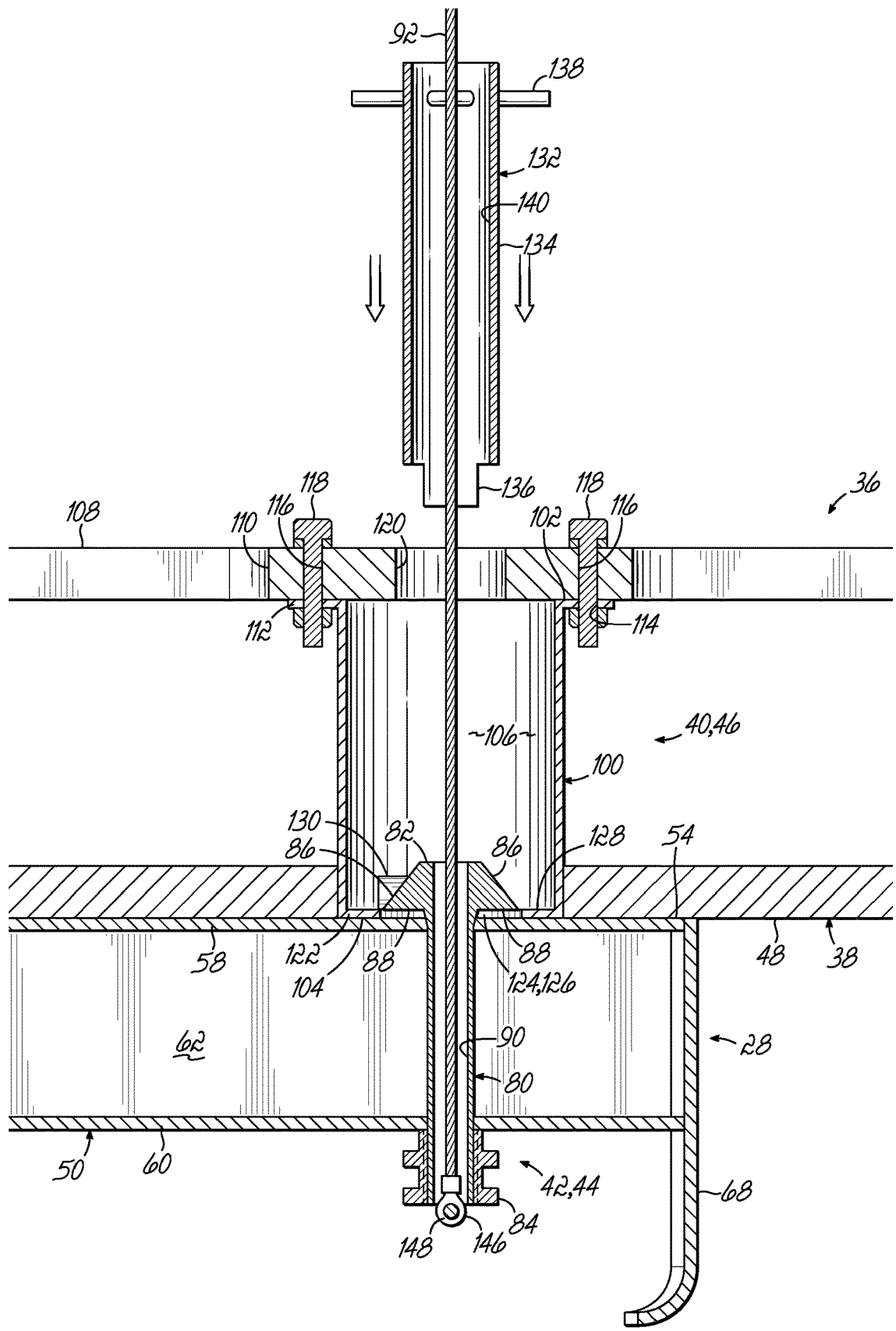

As mentioned above, because the pilot cables 92 extend through both the sockets 100 and the lock pins 80, these two connecting elements 40, 42 of the connection system 36 are self-aligning. As illustrated in FIGS. 15 and 16, as the support frame 28 nears the nacelle 14, and with the lock pins 80 in an unlocked position, the heads 82 of the lock pins 80 align with the keyways 124 of the sockets 100 and are permitted to pass through the keyways 124 and be positioned in the passageways 106 of the sockets 100. The winches 144 may be activated, for example, until the upper wall 58 of the anchor beam 50 engages with the exterior of the lower wall 48 of the nacelle 14 or engages with the lower end 104 of the sockets 100 (in the event the sockets 100 extend beyond the exterior surface of the lower wall 48). As illustrated in FIG. 16, the heads 82 of the lock pins 80 are positioned above, such as just slightly above, the upper surface 128 of the end plate 122. This arrangement provides clearance to allow the lock pins 82 to rotate relative to the sockets 100.

Figure 17:
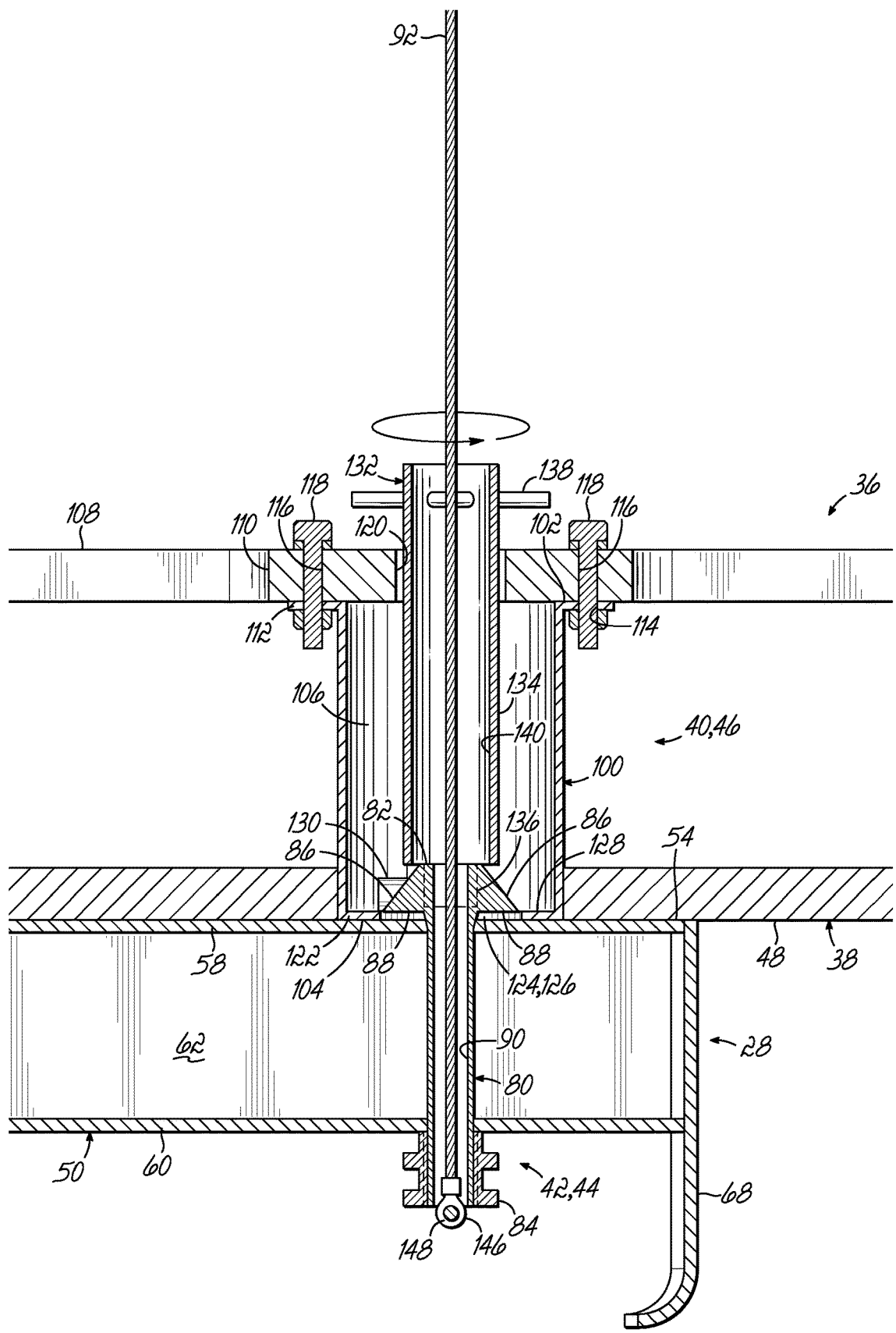
Figure 18:
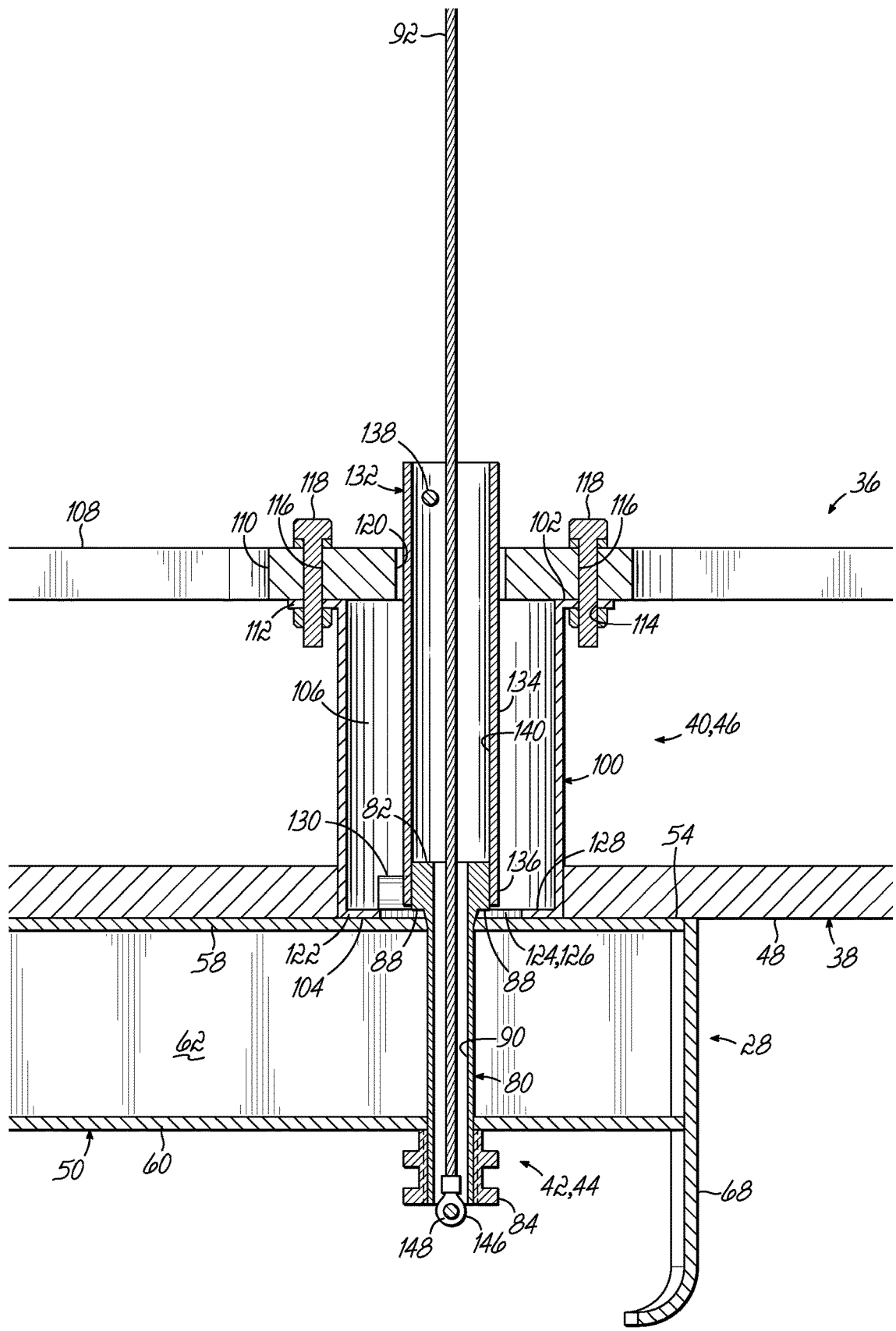
Figure 19:
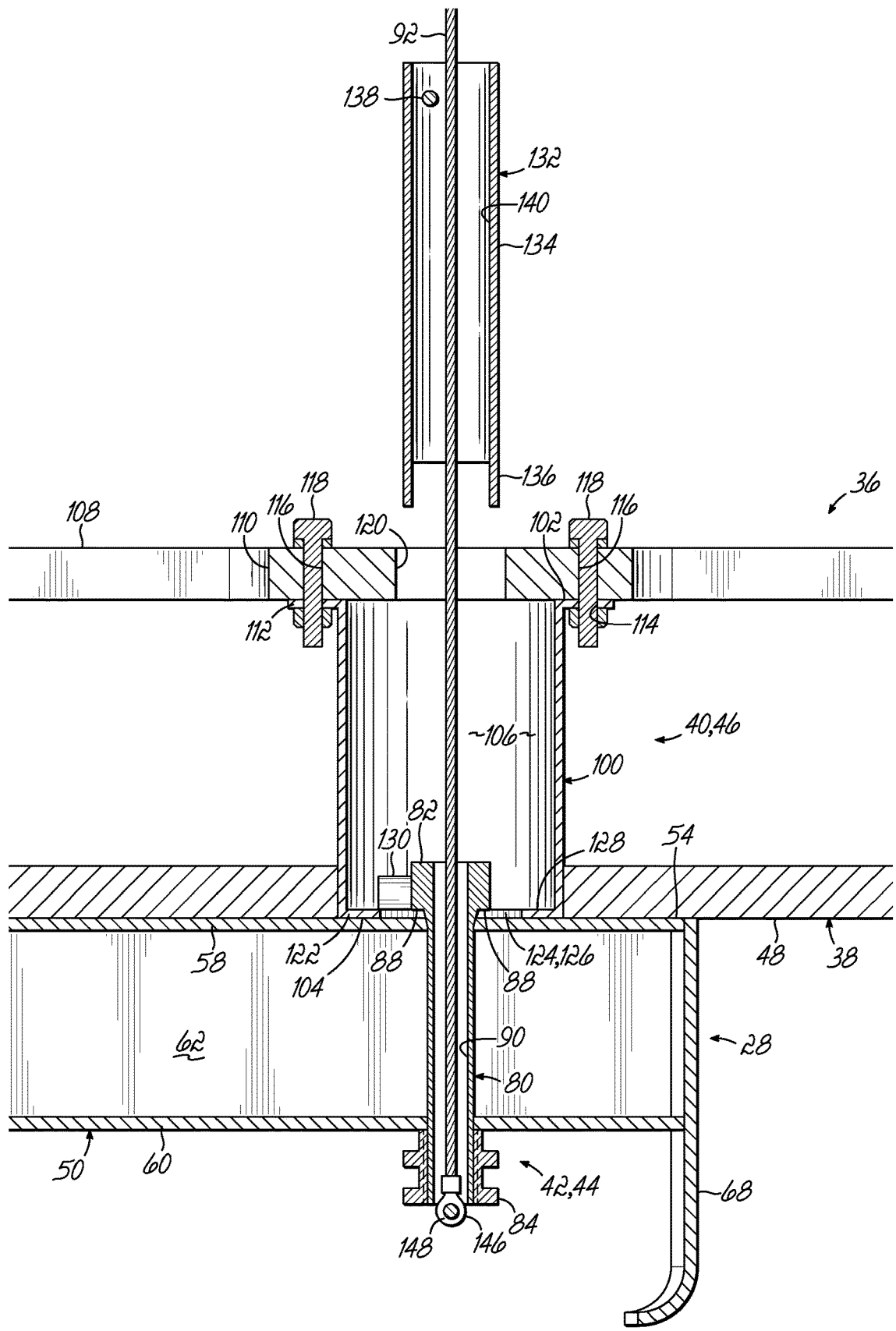

As illustrated in FIGS. 17 and 18, the keys 132 may be lowered along the pilot cables 92 such that the pin interfaces 136 are inserted through the main openings 120 in the lugs 110 and into the passageways 106 of the sockets 110 to engage with the heads 82 of the lock pins 80 located therein. The keys 132 may then be rotated from within the interior of the nacelle 14 to move the lock pins 80 from the unlocked position to the locked position. The rotation of the keys 132 may be performed manually or with the use of a tool. In any event, in the locked position, the pawls 86 of the heads 82 of the lock pins 80 (which now extend in and out of the paper in FIGS. 18 and 19) overlie the upper surface 128 of the end plates 122 and the lock pins 80 are prevented from passing back through the keyways 124 and disengaging from the sockets 100. Accordingly, the support frame 28 of the blade access system 24 is now securely coupled to the nacelle 14 by the connection system 36.

From here, the blade service platform 26 may be positioned on the work surface underneath the blade 20 and adjacent the base of the tower 12 and operatively coupled to the plurality of lifting cables 30 that extend from the support frame 28 mounted on the lower wall 48 of the nacelle 14. The connection of the lifting cables 30 to the blade service platform 26 is well known, as is the operation of the blade service platform 26 to move the platform along the length of the wind turbine blade 20. Accordingly, these aspects are not described further herein.

When work with the blade access system 24 is complete (i.e., on one or more of the wind turbine blades 20 of the wind turbine 10), the blade access system 24 may be dismantled in essentially the reverse order. In this regard, the blade service platform 26 may be lowered to the work surface and disconnected from the lifting cables 30. The keys 132 may be lowered along the pilot cables 92 such that the pin interfaces 136 are inserted through the main openings 120 in the lugs 110 and into the passageways 106 of the sockets 110 to engage with the heads 82 of the lock pins 80 located therein. The keys 132 may then be rotated from within the interior of the nacelle 14 to move the lock pins 80 from the locked position to the unlocked position. The rotation of the keys 132 may be performed manually or with the use of a tool. Of course, this is done while the support frame 28 is supported by the pilot cables 92 of the winches 144. In any event, in the unlocked position, the pawls 86 of the heads 82 of the lock pins 80 are aligned with the keyways 124 in the end plates 122 of the sockets 100 and the lock pins 80 are permitted to pass back through the keyways 124 and disengage from the sockets 100. Accordingly, the support frame 28 of the blade access system 24 may now be decoupled from the nacelle 14. In this regard, the winches 144 may be activated, for example, to pay out the pilot cables 92 and lower the support frame 28 from the nacelle 14 and toward the work surface.

Once on the work surface, the support frame 28 may be detached from the pilot cables 92 and the pilot cables 92 may be reeled back in toward the winches 144. The plurality of lifting cables 30 may be removed from the support frame 28 and stored. If the winches 144 are temporary, they may be removed from the nacelle 14 at this time. Covers may then be placed on or in the nacelle connecting members 40 to limit the ingress of air, water and other debris into the interior of the nacelle 14 through the nacelle connecting members 40. The addition of the covers to the nacelle connecting members 40 may be achieved from within the interior of the nacelle 14.

Figure 20:
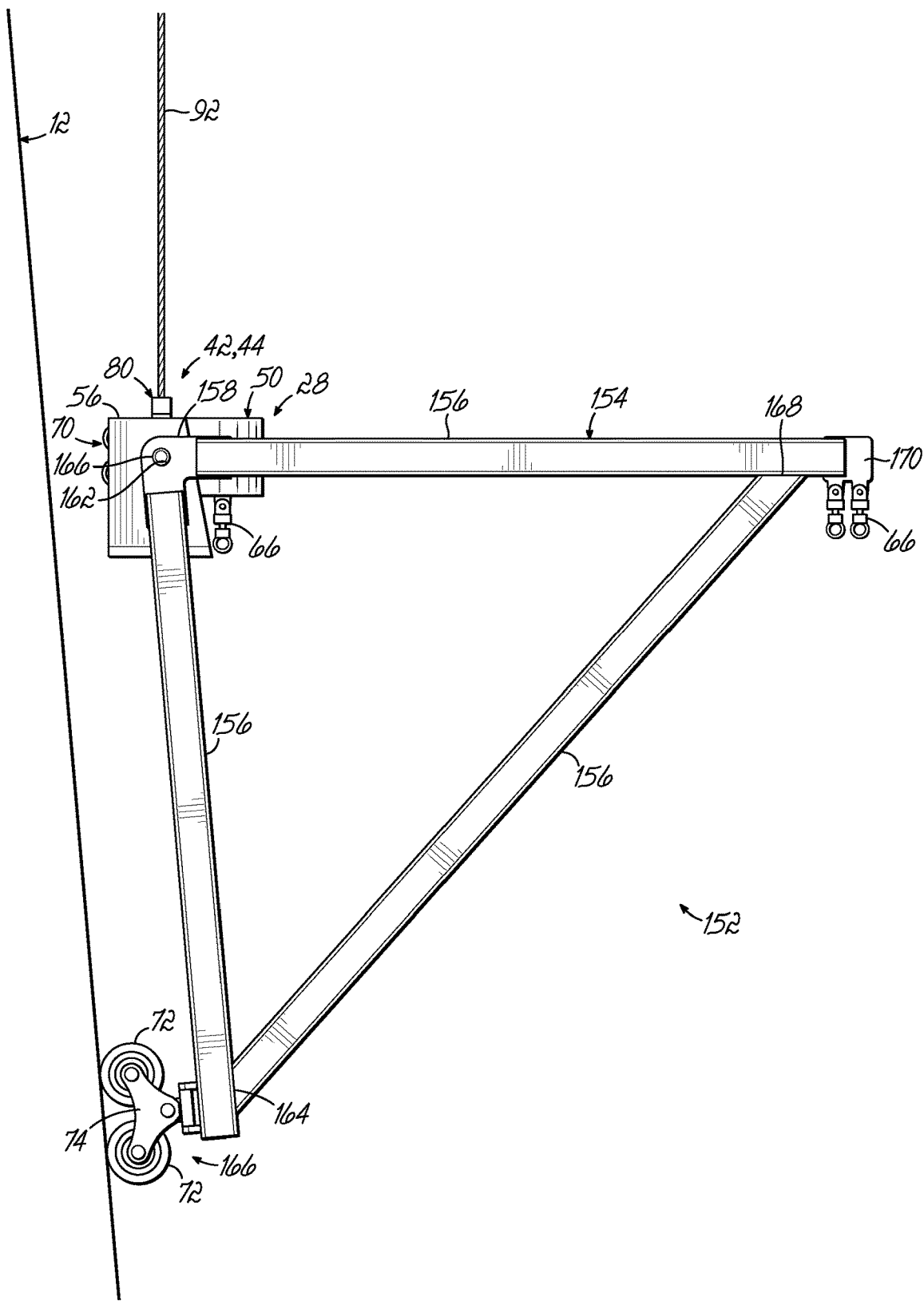
FIG. 20 is a side view of a support frame for the blade access system in accordance with a further embodiment.

FIG. 20 illustrates an alternative embodiment of the support frame 28 in accordance with the invention. In this embodiment, the support frame 28 includes an outrigger 152 coupled to the each of the first and second ends 54, 56 of the anchor beam 50 (only one shown). Each outrigger 152 includes a generally triangular frame 154 formed by, for example, three elongate struts 156 coupled together in a triangular configuration. A first intersection or corner 158 of the frame 154 is configured to be operatively coupled to an end 54, 56 of the anchor beam 50. In an exemplar embodiment, for example, the ends 54, 56 of the anchor beam 50 include a cylindrical shaft 160 extending away from the ends 54, 56 of the beam 50, and the outrigger 152 includes a hole or aperture 162 configured to rotatably receive the shaft 160 therein. This arrangement allows the outriggers 152 to rotate relative to the anchor beam 50 about an axis defined by the shaft 160. The outriggers 152 may then be securely but rotatably mounted onto the shaft 160.

Another intersection or corner 164 of the triangular frame 154 may include one or more tower guides 166 configured to engage with the tower 12 of the wind turbine 10 during the mounting of the support frame 28 to the nacelle 14. In one embodiment, the tower guides 70 may include a wheel carriage 74 having a plurality of wheels 72 (two shown). During lifting of the anchor beam 50 from the work surface to the nacelle 14, the wheels 72 may be configured to engage with and roll along the outer surface of the tower 12, thereby supporting and guiding the anchor beam 50 as it is being lifted toward the nacelle 14. Similar to the above, the one or more tower guides 166 may include one or more low-friction bearing pads or other rolling and/or sliding elements.

A third intersection or corner 168 of the triangular frame 154 may include an attachment plate 170 configured to receive one or more lifting cables 30 of the blade access system 30. More particularly, the attachment plate 170 may be configured to couple to one or more swivel fasteners 66, for example, for attaching to respective lifting cables 30.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A blade access system for servicing at least one blade of a wind turbine, the wind turbine including a tower, a nacelle coupled to the tower, and a rotor coupled to the nacelle and having the at least one blade, the blade access system comprising:
   a support frame configured to be coupled to the nacelle;
   a plurality of lifting cables configured to be coupled to the support frame; and
   a blade service platform configured to be coupled to the plurality of lifting cables and move along the at least one blade using the plurality of lifting cables,
   wherein the support frame includes at least one support frame connecting member configured to be selectively attached to and detached from at least one nacelle connecting member included with the nacelle, and
   wherein the at least one support frame connecting member is configured to cooperate with the at least one nacelle connecting member to define an unlocked position which is configured to allow the support frame to attach to and detach from the nacelle, and a locked position which is configured to prevent the support frame from detaching from the nacelle.

2. The blade access system of claim 1, wherein the at least one support frame connecting member is movable relative to the support frame between a first position and a second position, wherein the first position corresponds to the unlocked position relative to the nacelle connecting member, and wherein the second position corresponds to the locked position relative to the nacelle connecting member.

3. The blade access system of claim 2, wherein the at least one support frame connecting member is rotatable relative to the support frame between the first position and the second position.

4. The blade access system of claim 1, wherein the at least one support frame connecting member includes a lock pin, the lock pin comprising:
   an elongate shaft;
   an enlarged head at a first end of the elongate shaft; and
   a lock nut attachable to a second end of the elongate shaft.

5. The blade access system of claim 4, wherein the lock pin includes a passageway extending from the enlarged head to the second end of the elongate shaft.

6. The blade access system of claim 4, wherein the enlarged head is generally rectangular with a first side having a first length and a second side having a second length, and wherein the second length is less than the first length.

7. The blade access system of claim 4, wherein the support frame includes an anchor beam defining an upper wall, lower wall, rear wall, front wall, first end, and second end, wherein the plurality of lifting cables are configured to be coupled to the lower wall of the anchor beam, and the lock pin extends through the anchor beam such that the enlarged head is adjacent the upper wall and the lock nut is adjacent the lower wall.

8. The blade access system of claim 7, wherein the support frame further comprises at least one tower guide coupled to the rear wall of the anchor beam and configured to engage with the tower of the wind turbine during mounting of the support frame to the nacelle.

9. The blade access system of claim 7, wherein the support frame further comprises support feet adjacent the first and second ends of the anchor beam and configured to support the support frame on a work surface.

10. The blade access system of claim 7, wherein the support frame further comprises:
- a first outrigger configured to be rotatably mounted to the first end of the anchor beam; and
- a second outrigger configured to be rotatably mounted to the second end of the anchor beam, wherein each of the first outrigger and the second outrigger includes at least one tower guide configured to engage with the tower of the wind turbine during mounting of the support frame on the nacelle.

11. The blade access system of claim 1, further comprising a key for positioning the at least one nacelle connecting member and the at least one support frame connecting member in the locked and unlocked positions.

12. The blade access system of claim 1, wherein the support frame includes a plurality of support frame connecting members.

13. A nacelle for a wind turbine configured for coupling to a blade access system for servicing at least one blade of the wind turbine, the blade access system including a support frame, a plurality of lifting cables, and a blade service platform, the nacelle comprising:
- an inner structural frame;
- an outer housing coupled to and disposed about the inner structural frame; and
- at least one nacelle connecting member coupled to the inner structural frame and configured to be selectively attached to and detached from the at least one support frame connecting member included with the support frame of the blade access system, the at least one nacelle connecting member extending from the structural frame to the outer housing so as to be accessible from an exterior of the nacelle,
- wherein the at least one nacelle connecting member is configured to cooperate with the at least one support frame connecting member to define an unlocked position which is configured to allow the support frame to attach to and detach from the nacelle, and a locked position which is configured to prevent the support frame from detaching from the nacelle.

14. The nacelle of claim 13, wherein the structural frame includes a bed plate, and wherein the at least one nacelle connecting member is coupled to the bed plate.

15. The nacelle of claim 14, wherein the bed plate includes at least one lug having an opening extending through the at least one lug, and wherein the at least one nacelle connecting member is coupled to the at least one lug.

16. The nacelle of claim 13, wherein the outer housing includes a lower wall, and wherein the at least one nacelle connecting member extends from the structural frame to the lower wall so as to be accessible from the exterior of the nacelle.

17. The nacelle of claim 16, wherein an end of the nacelle connecting member is either substantially flush with or extends beyond an exterior surface of the lower wall.

18. The nacelle of claim 13, wherein the at least one nacelle connecting member includes a socket, the socket comprising:
- a tubular body having a first end, a second end, and a passageway extending between the first end and the second end, wherein the first end is attached to the structural frame and the second end is adjacent the outer housing and accessible from the exterior of the nacelle; and
- a keyway adjacent the second end of the tubular body and configured to allow or prevent the socket to engage with the at least one support frame connecting member.

19. The nacelle of claim 18, wherein the first end of the tubular body includes a flange for attaching to the structural frame, and wherein the second of the tubular body includes an end plate, the keyway being formed in the end plate.

20. The nacelle of claim 19, wherein the end plate further includes a boss for limiting movement of the support frame connecting member when the support frame connecting member is engaged with the nacelle connecting member.

21. The nacelle of claim 18, wherein the keyway is configured as a generally rectangular slot with a first side having a first length and a second side having a second length, and wherein the second length is less than the first length.

22. The nacelle of claim 13, wherein the nacelle includes a plurality of nacelle connecting members.

23. A method of using a blade access system with a nacelle of a wind turbine for servicing at least one blade of the wind turbine,
- wherein the blade access system comprises a support frame, a plurality of lifting cables, and a blade service platform,
- wherein the wind turbine comprises a tower, the nacelle coupled to the tower, and a tower coupled to the nacelle and having the at least one blade, and
- wherein the support frame includes at least one support frame connecting member, the nacelle includes at least one nacelle connecting member accessible from an exterior of the nacelle, and the at least one support frame connecting member is configured to cooperate with the at least one nacelle connecting member to define an unlocked position which is configured to allow the support frame to attach to and detach from the nacelle, and a locked position which is configured to prevent the support frame from detaching from the nacelle,
- the method comprising:
- positioning the support frame on a work surface adjacent the tower;
- arranging the at least one support frame connecting member and the at least one nacelle connecting member in the unlocked position;
- raising the support frame from the work surface toward the nacelle;
- engaging the at least one support frame connecting member with the at least one nacelle connecting member; and
- arranging the at least one support frame connecting member and the at least one nacelle connecting member in the locked position to thereby attach the support frame to the nacelle.

24. The method of claim 23, wherein the at least one nacelle connecting member is fixed to the nacelle, and wherein the at least one support frame connecting member is movable relative to the support frame between a first position and a second position, wherein the first position corresponds to the unlocked position relative to the nacelle connecting member, and wherein the second position corresponds to the locked position relative to the nacelle connecting member,
- wherein arranging the at least one support frame connecting member and the at least one nacelle connecting member in the unlocked position further comprises positioning the at least one support frame connecting member in the first position, and
- wherein arranging the at least one support frame connecting member and the at least one nacelle connecting member in the locked position further comprises positioning the at least one support frame connecting member in the second position.

25. The method of claim 24, wherein positioning the at least one support frame connecting member in the first position further comprises rotating the support frame connecting member to the first position, and wherein positioning the at least one support frame connecting member in the second position further comprises rotating the support frame connecting member to the second position.

26. The method of claim 24, wherein arranging the at least one support frame connecting member and the at least one nacelle connecting member in the locked position further comprises:
engaging the at least one support frame connecting member with a key from an interior of the nacelle; and
moving the key to position the at least one support frame connecting member in the second position.

27. The method of claim 23, wherein raising the support frame from the work surface toward the nacelle further comprises:
providing at least one winch in the nacelle adjacent the at least one nacelle connecting member, the at least one winch capable of reeling out and paying in a pilot cable having an end;
inserting the end of the pilot cable through the at least one nacelle connecting member;
coupling the pilot cable to the at least one support frame connecting member on the support frame; and
actuating the at least one winch to raise the support frame from the work surface toward the nacelle,
wherein the at least one support frame connecting member and the at least one nacelle connecting member align with each other as the support frame approaches the nacelle.

28. The method of claim 23, further comprising coupling the plurality of lifting cables to the support frame while the support frame is on the work surface.

29. The method of claim 23, further comprising:
positioning the blade service platform on the work surface adjacent the tower; and
attaching the plurality of lifting cables to the blade service platform, thereby permitting the blade service platform to move along the length of the at least one blade.

30. The method of claim 23, further comprising:
arranging the at least one support frame connecting member and the at least one nacelle connecting member in the unlocked position;
disengaging the at least one support frame connecting member from the at least one nacelle connecting member to thereby detach the support frame from the nacelle; and
lowering the support frame from the nacelle toward the work surface.

31. The method of claim 30, wherein the at least one nacelle connecting member is fixed to the nacelle, and wherein the at least one support frame connecting member is movable relative to the support frame between a first position and a second position, wherein the first position corresponds to the unlocked position relative to the nacelle connecting member, and wherein the second position corresponds to the locked position relative to the nacelle connecting member,
wherein arranging the at least one support frame connecting member and the at least one nacelle connecting member in the unlocked position further comprises positioning the at least one support frame connecting member in the first position,
wherein arranging the at least one support frame connecting member and the at least one nacelle connecting member in the locked position further comprises positioning the at least one support frame connecting member in the second position, and
wherein arranging the at least one support frame connecting member and the at least one nacelle connecting member in the unlocked position further comprises positioning the at least one support frame connecting member in the first position.

* * * * *